(12) United States Patent
Wilson et al.

(10) Patent No.: US 9,639,969 B1
(45) Date of Patent: May 2, 2017

(54) COLLABORATIVE DESIGN

(71) Applicant: Overlay Studio, Inc., Provo, UT (US)

(72) Inventors: Joseph Loyal Wilson, Provo, UT (US); Kevin James Heap, Lehi, UT (US); Spencer Patrick Smith, Provo, UT (US)

(73) Assignee: Overlay Studio, Inc., Provo, UT (US)

( * ) Notice: Subject to any disclaimer, the term of this patent is extended or adjusted under 35 U.S.C. 154(b) by 0 days.

(21) Appl. No.: 14/341,638

(22) Filed: Jul. 25, 2014

Related U.S. Application Data

(60) Provisional application No. 61/858,351, filed on Jul. 25, 2013.

(51) Int. Cl.
*G06T 11/60* (2006.01)
*H04L 12/58* (2006.01)

(52) U.S. Cl.
CPC .............. *G06T 11/60* (2013.01); *H04L 51/10* (2013.01); *H04L 51/32* (2013.01); *H04L 51/34* (2013.01)

(58) Field of Classification Search
CPC ......... G06Q 10/04; G06Q 40/02; G06T 11/60
See application file for complete search history.

(56) References Cited

U.S. PATENT DOCUMENTS

| | | | | |
|---|---|---|---|---|
| 8,886,723 | B1* | 11/2014 | Gargi | G06Q 10/10 709/204 |
| 2005/0049986 | A1* | 3/2005 | Bollacker | G06Q 10/04 706/46 |
| 2008/0294678 | A1 | 11/2008 | Gorman et al. | |
| 2011/0016409 | A1 | 1/2011 | Grosz et al. | |
| 2011/0030031 | A1 | 2/2011 | Lussier et al. | |
| 2011/0087764 | A1* | 4/2011 | Yaffe | G06Q 10/10 709/223 |
| 2012/0192087 | A1 | 7/2012 | Lemmey | |
| 2014/0096041 | A1 | 4/2014 | Gowen et al. | |
| 2014/0132633 | A1* | 5/2014 | Fekete | G06T 11/60 345/634 |
| 2014/0136381 | A1* | 5/2014 | Joseph | G06Q 40/02 705/35 |

* cited by examiner

*Primary Examiner* — Kee M Tung
*Assistant Examiner* — Yanna Wu
(74) *Attorney, Agent, or Firm* — Patent Law Works LLP

(57) ABSTRACT

Various implementations related to collaborative design are described. In one such implementation, a computer-implemented method includes receiving, using one or more computing devices, input from a second user selecting to remix an existing design of a first user; generating, using the one or more computing devices, a new version of the existing design including one or more layers from the existing design; receiving, using the one or more computing devices, one or more design inputs from the second user, the one or more design inputs remixing at least one of the one or more layers included from the existing design; applying, using the one or more computing devices, the one or more design inputs to the new version of the existing design to create a remixed design; and sharing, via a computer network, the remixed design with one or more other users.

12 Claims, 35 Drawing Sheets

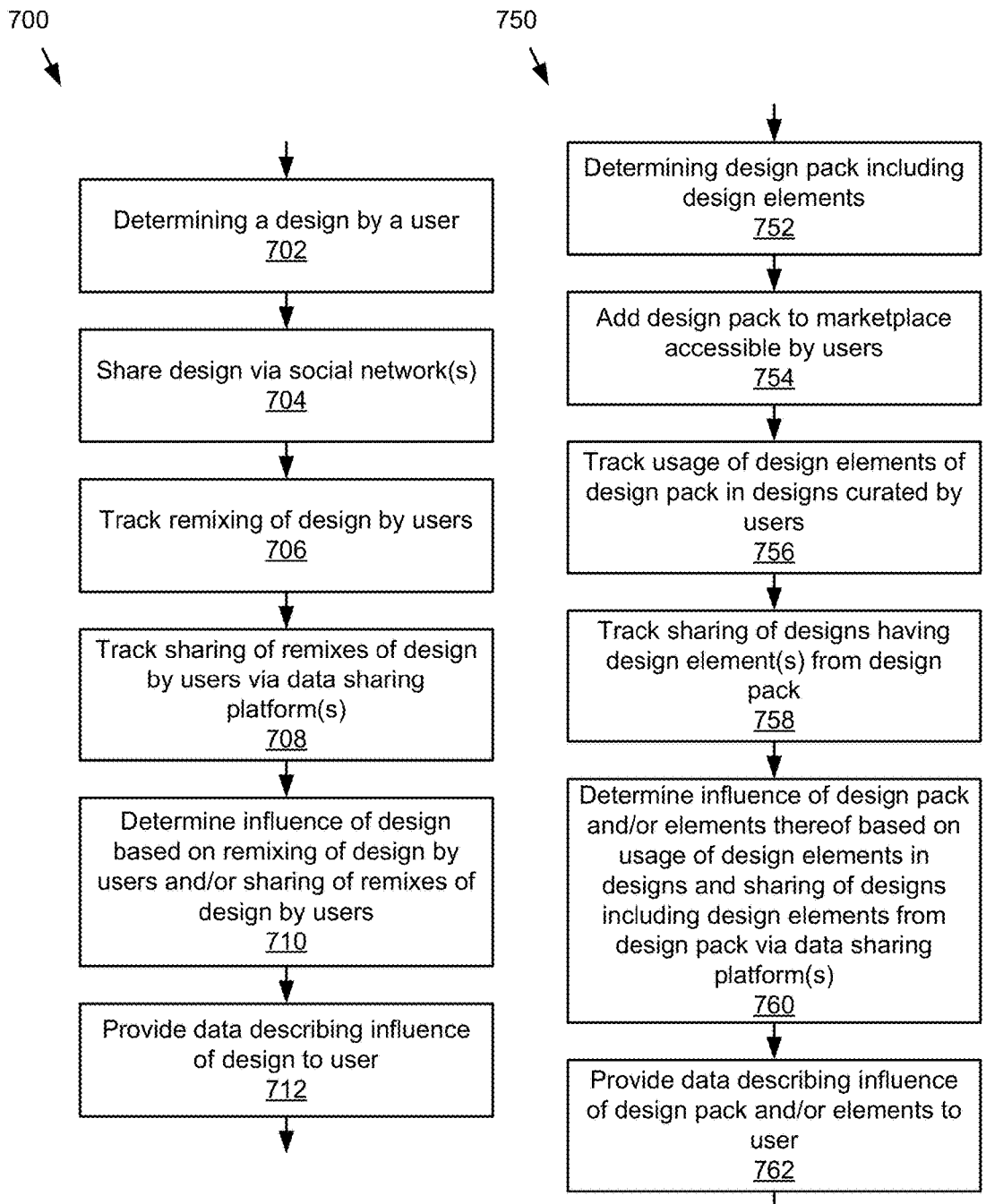

COLLABORATIVE DESIGN

CROSS-REFERENCE TO RELATED APPLICATIONS

This application claims the benefit under 35 U.S.C. §119(e) of U.S. Provisional Patent Application No. 61/858,351, entitled "Collaborative Design" and filed Jul. 25, 2013, the entire contents of which are incorporated herein by reference.

BACKGROUND

The present disclosure relates to technology for generating and sharing designs for use and remixing others.

Existing sharing services, such as social networks, microblogs and photo sharing platforms, allow users to share and interact with content produced by them and others. However, when shared using existing solutions, the underlying content, such as photos and video, remains static. For example, a photograph posted by a user to his/her social stream can be tagged, commented on, liked, or otherwise interacted with by other users on the social network, but the photograph itself generally remains unmodified. Further, existing solutions generally lack options for users to share, collaborate on designs, and iterate one another's creations. As a result, these solutions fail to provide insights on the usage of designs within a social, collaborative context.

SUMMARY

According to one innovative aspect of the subject matter described in this disclosure, a system includes one or more processors and one or more memories storing instructions that, when executed by the one or more processors, cause the system to perform various operations, which include receiving input from a second user selecting to remix an existing design of a first user; generating a new version of the existing design including one or more layers from the existing design; receiving one or more design inputs from the second user, the one or more design inputs remixing at least one of the one or more layers included from the existing design; applying the one or more design inputs to the new version of the existing design to create a remixed design; and sharing, via a computer network, the remixed design with one or more other users.

Another innovative aspect of the subject matter described in this disclosure may be embodied in methods that include receiving, using one or more computing devices, input from a second user selecting to remix an existing design of a first user; generating, using the one or more computing devices, a new version of the existing design including one or more layers from the existing design; receiving, using the one or more computing devices, one or more design inputs from the second user, the one or more design inputs remixing at least one of the one or more layers included from the existing design; applying, using the one or more computing devices, the one or more design inputs to the new version of the existing design to create a remixed design; and sharing, via a computer network, the remixed design with one or more other users.

Another innovative aspect of the subject matter described in this disclosure may be embodied in a non-transitory tangible computer-readable medium having stored thereon one or more data structures comprising: first metadata for a plurality of graphical layers of a first layered image comprising an initial graphical design; a first flattened image of the initial graphical design; second metadata for a plurality of graphical layers of a second layered image comprising a remixed version of the initial graphical design; and a second flattened image of the remixed version of the initial graphical design.

Another innovative aspect of the subject matter described in this disclosure may be embodied in methods that include determining a design by a user; sharing the design via one or more social networks; tracking remixing of the design into remixes by users; tracking sharing of remixes of the design by the users via the one or more social networks; determining an influence of the design based on remixing of the design by the users and sharing of the remixes of the design by the users; and providing data describing the influence of the design to the user.

Another innovative aspect of the subject matter described in this disclosure may be embodied in methods that include determining, using one or more computing devices, a design pack including design elements, the design pack being associated with a user; adding, using one or more computing devices, the design pack to a marketplace accessible by other users; tracking, using one or more computing devices, usage of the design elements of the design pack in designs curated by the users; tracking, using one or more computing devices, sharing of designs having one or more of the design elements from the design pack; and determining, using one or more computing devices, an influence of one or more of the design pack and one or more elements of the design pack based on the usage of the design elements in the designs and the sharing of the designs including one or more of the design elements from the design pack.

Other implementations of one or more of these aspects or other aspects include corresponding systems, apparatus, and computer programs, configured to perform the various actions and/or store various data described in association with these aspects. These and other implementations, such as various data structures, are encoded on tangible computer storage devices. Numerous additional features may in some cases be included in these and various other implementations, as discussed throughout this disclosure. It should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

FIGS. 7A and 7B are flowcharts of example methods for determining the influence of designs and design packs.

DETAILED DESCRIPTION

The technology disclosed in this application allows, among other things, users to create shareable designs and leverage their social graphs to share their creations with others for viewing, sharing, and/or remixing, etc. Remixing a design includes modifying one or more aspects of an existing design based on design input(s) provided by a user. The technology may include various systems, methods, computer program products, interfaces, and other aspects to provide these and other advantages, acts, and/or functionality.

Figure 1:
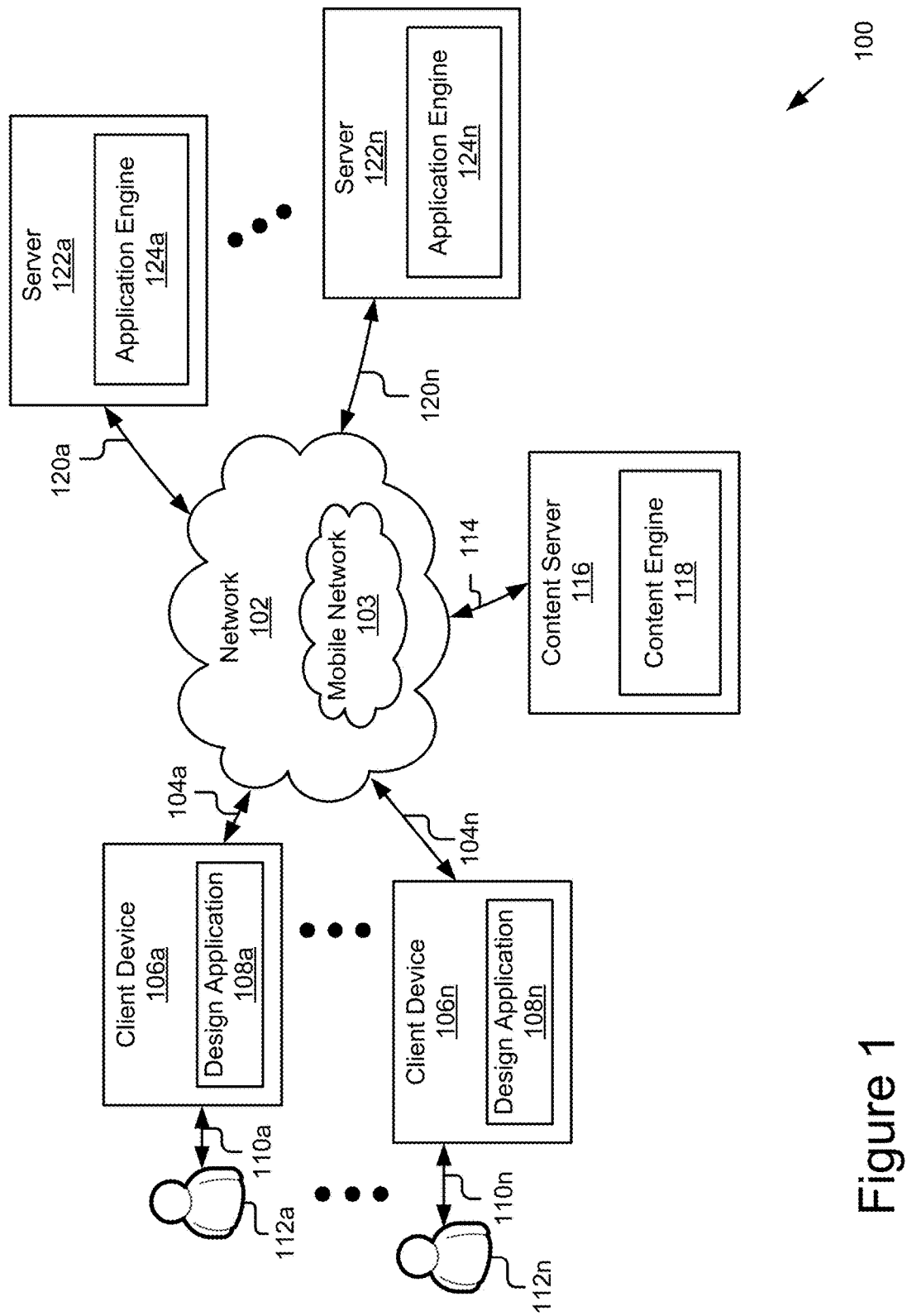
FIG. 1 is a block diagram illustrating an example system for collaborative design.

FIG. 1 is a block diagram illustrating an example system 100 for collaborative design. The illustrated system 100 includes client devices 106a . . . 106n, a content server 116, and servers 122a . . . 122n, which are communicatively coupled via a network 102 for interaction with one another. For example, the client devices 106a . . . 106n may be respectively coupled to the network 102 via signal lines 104a . . . 104n and may be accessible by users 112a . . . 112n (also referred to individually and collectively as 112) as illustrated by lines 110a . . . 110n. The content server 116 may be coupled to the network 102 via signal line 114. The servers 122a . . . 122n (also referred to individually and collectively as 122) may be respectively coupled to the network 102 via signal lines 120a . . . 120n. The use of the nomenclature "a" and "n" in the reference numbers indicates that any number of those elements having that nomenclature may be included in the system 100.

The network 102 may include any number of networks and/or network types. For example, the network 102 may include, but is not limited to, one or more local area networks (LANs), wide area networks (WANs) (e.g., the Internet), virtual private networks (VPNs), mobile (cellular) networks (e.g., the mobile network 103), wireless wide area network (WWANs), WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless networking software and/or hardware that interconnects the computing devices of the system 100. For example, the network 102 may include packet-switching devices that route the data packets to the various computing devices based on information included in a header of the data packets.

The mobile network 103 may include a cellular network having distributed radio networks and a hub. In some implementations, the client devices 106a . . . 106n may send and receive signals to and from a transmission node of the mobile network 103 over one or more of a control channel, a voice channel, a data channel, etc. In some implementations, one or more client devices 106a . . . 106n may connect to the network 102 via a wireless wide area network (WWAN) of the mobile network 103. For instance, the mobile network 103 may route the network data packets sent and received by the client device 106a to the other entities 106n, 116, and/or 122, etc., that are connected to the network 102 (e.g., via a the Internet, a VPN, etc.). The mobile network 103 and client devices 106 may use a multiplexing protocol or a combination of multiplexing protocols to communicate including, for example, FDMA, CDMA, SDMA, WDMA, or any derivative protocols, or the like, etc. The mobile network 103 and client devices 106 may also employ multiple-input and output (MIMO) channels to increase the data throughput over the signal lines coupling the mobile network 103 and client devices 106. The mobile network 103 may be any generation mobile phone network. In some instances, the mobile network 102 maybe a 2G or 2.5G GSM, IS-95, etc., network; a 3G UTMS, IS-2000, etc., network; a 4G HSPA+, 3GPP LTE, WiMax™, 5G+, etc., network; etc. In some instances, the mobile network 103 may include a backwards-compatible multi-generational network that supports two or more technology standards.

The client devices 106a . . . 106n (also referred to individually and collectively as 106) are computing devices having data processing and communication capabilities. In some implementations, a client device 106 may include a processor (e.g., virtual, physical, etc.), a memory, a power source, a network interface, and/or other software and/or hardware components, such as a display, graphics processor, wireless transceivers, keyboard, camera, sensors, firmware, operating systems, drivers, various physical connection interfaces (e.g., USB, HDMI, etc.). The client devices 106a . . . 106n may couple to and communicate with one another and the other entities of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106a . . . 106n may be the same or different types of computing devices.

In the depicted implementation, the client devices 106a . . . 106n respectively contain instances 108a . . . 108n of a design application (also referred to individually and collectively as 108). The design application 108 may be storable in a memory (e.g., see FIG. 3) and executable by a processor (e.g., see FIG. 3) of a client device 106 to provide for user interaction, receive user input, present information to the user via a display (e.g., see FIG. 3), and send data to and receive data from the other entities of the system 100 via the network 102. The design application 108 may be operable to allow users to create shareable designs, access content streams (e.g., social network streams, design streams, a combination of the foregoing, etc.), share their creations using services embodied by the application engines 124 and/or the content engine 118, collaborate on their creations with others, access, reuse, and iterate the designs of others, etc.

Figure 9A:
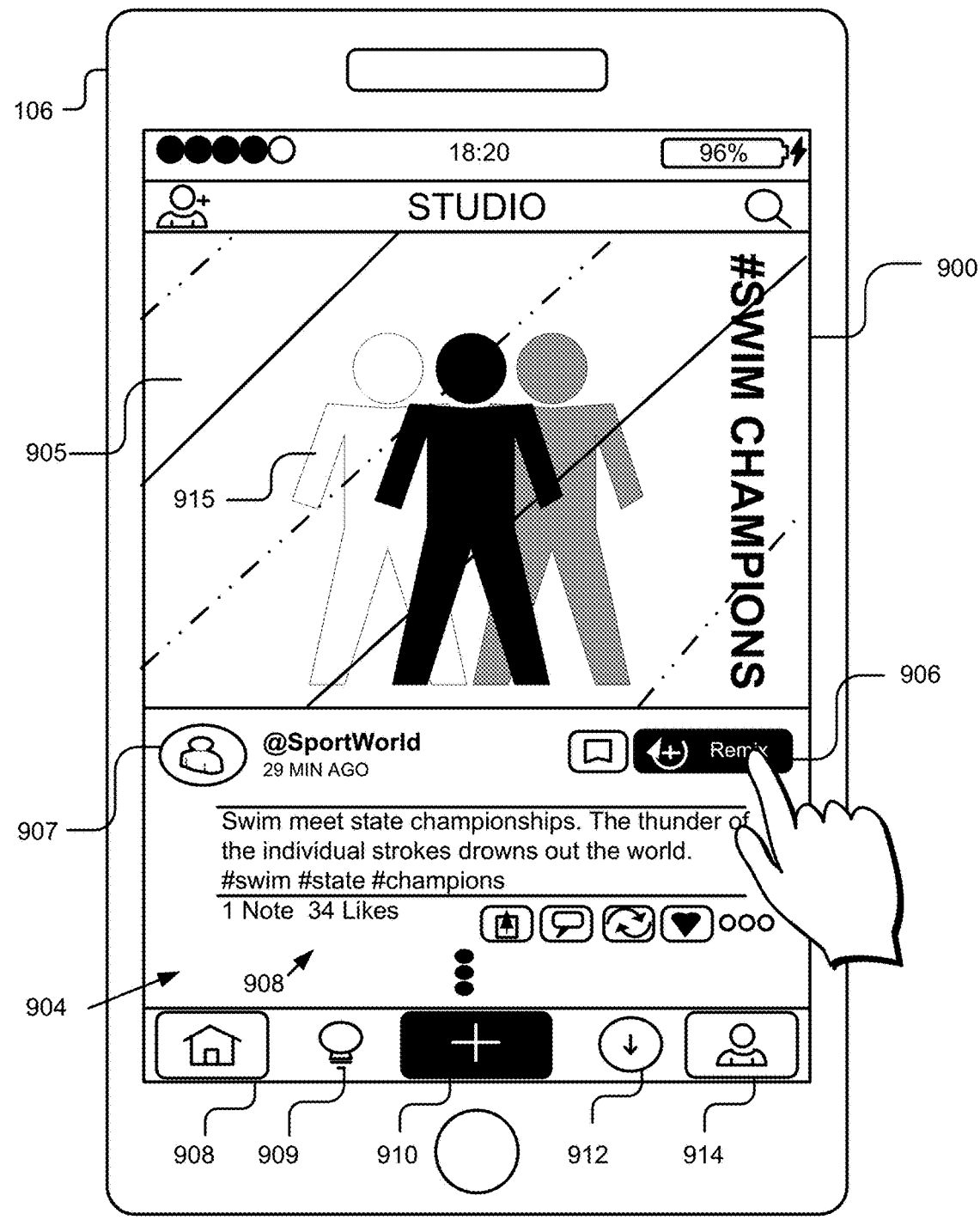
FIGS. 9A-9V are graphical representations of various example design-related user interfaces.
Figure 9B:
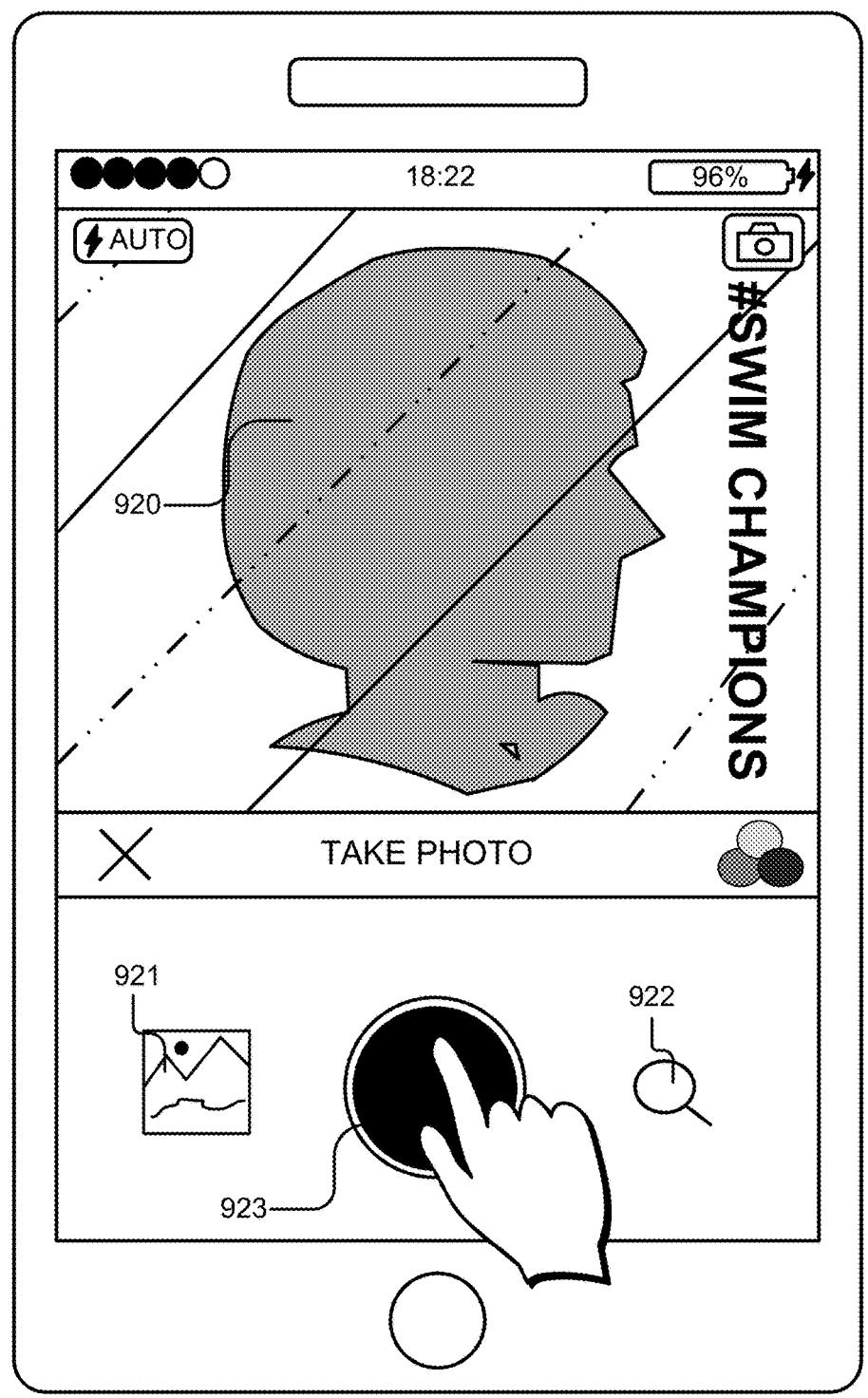
Figure 9C:
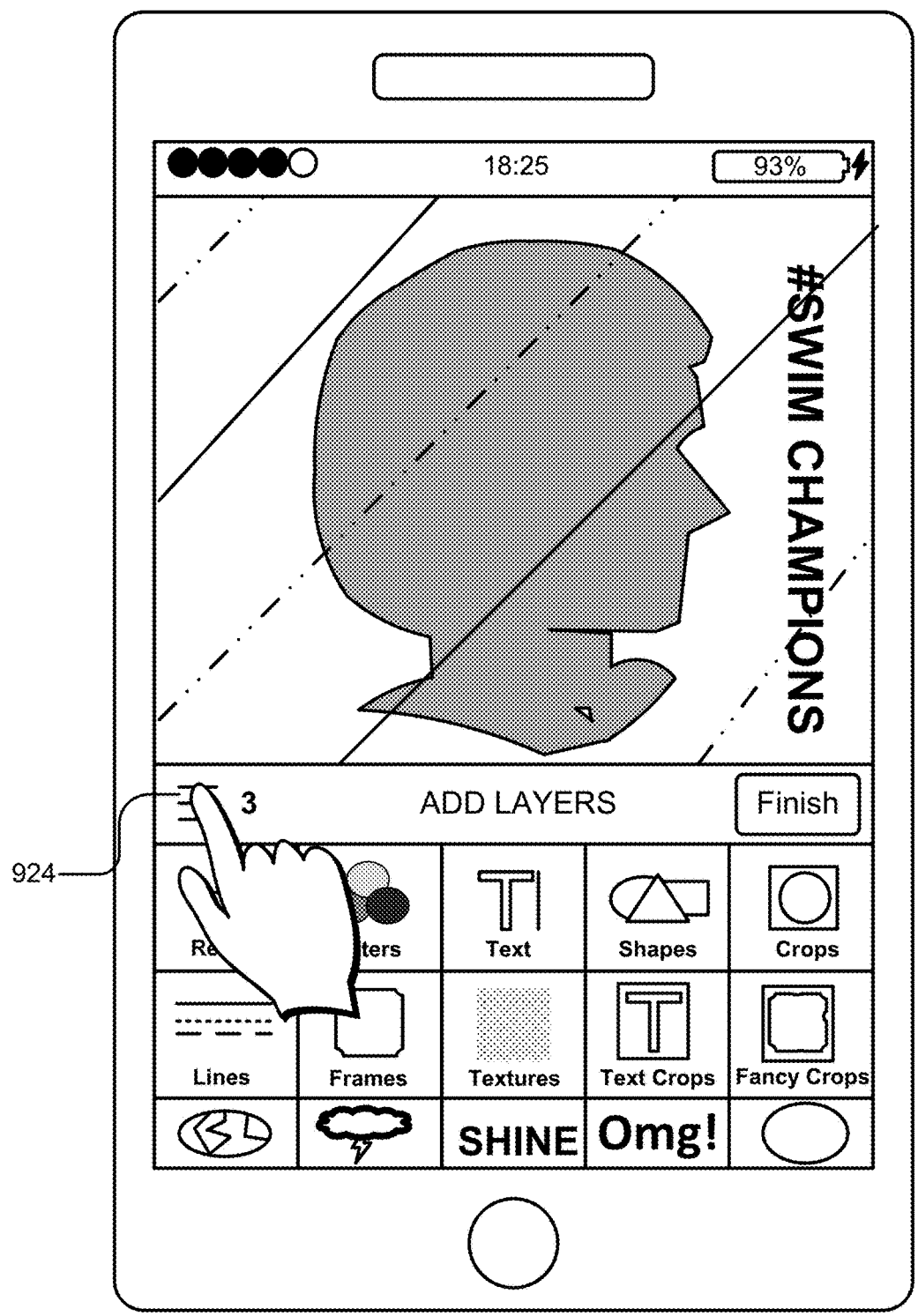
Figure 9D:
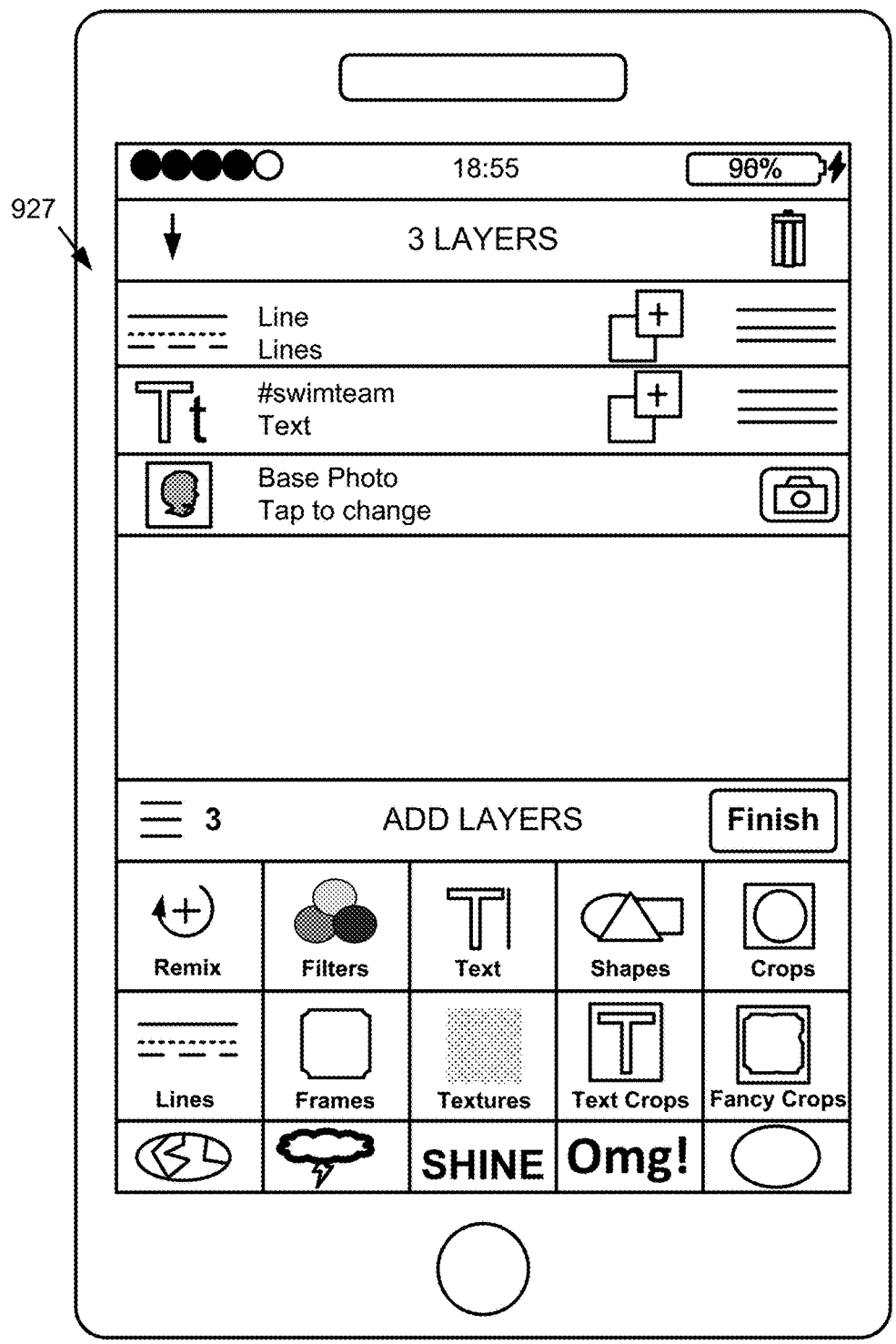
Figure 9E:
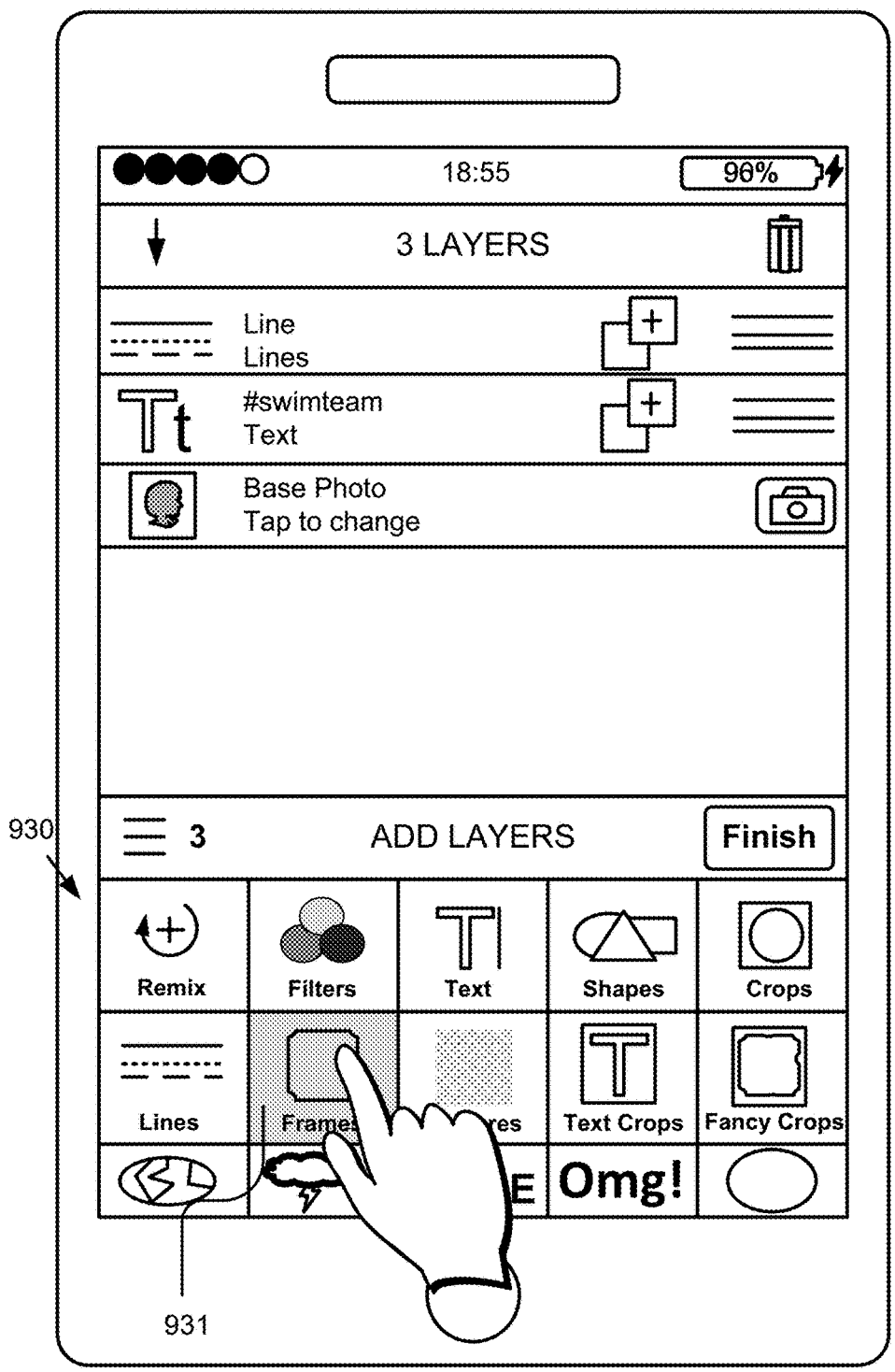
Figure 9F:
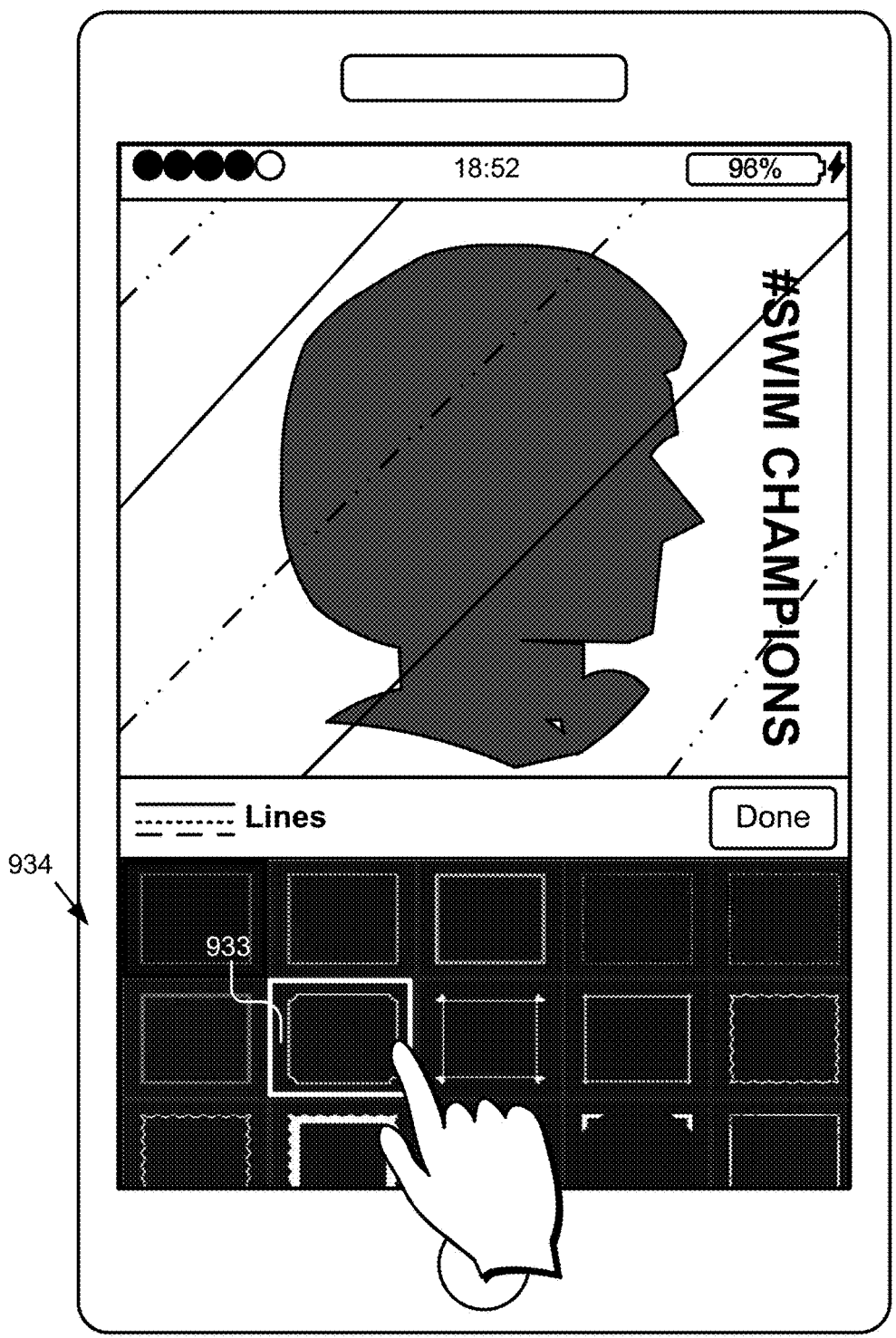
Figure 9G:
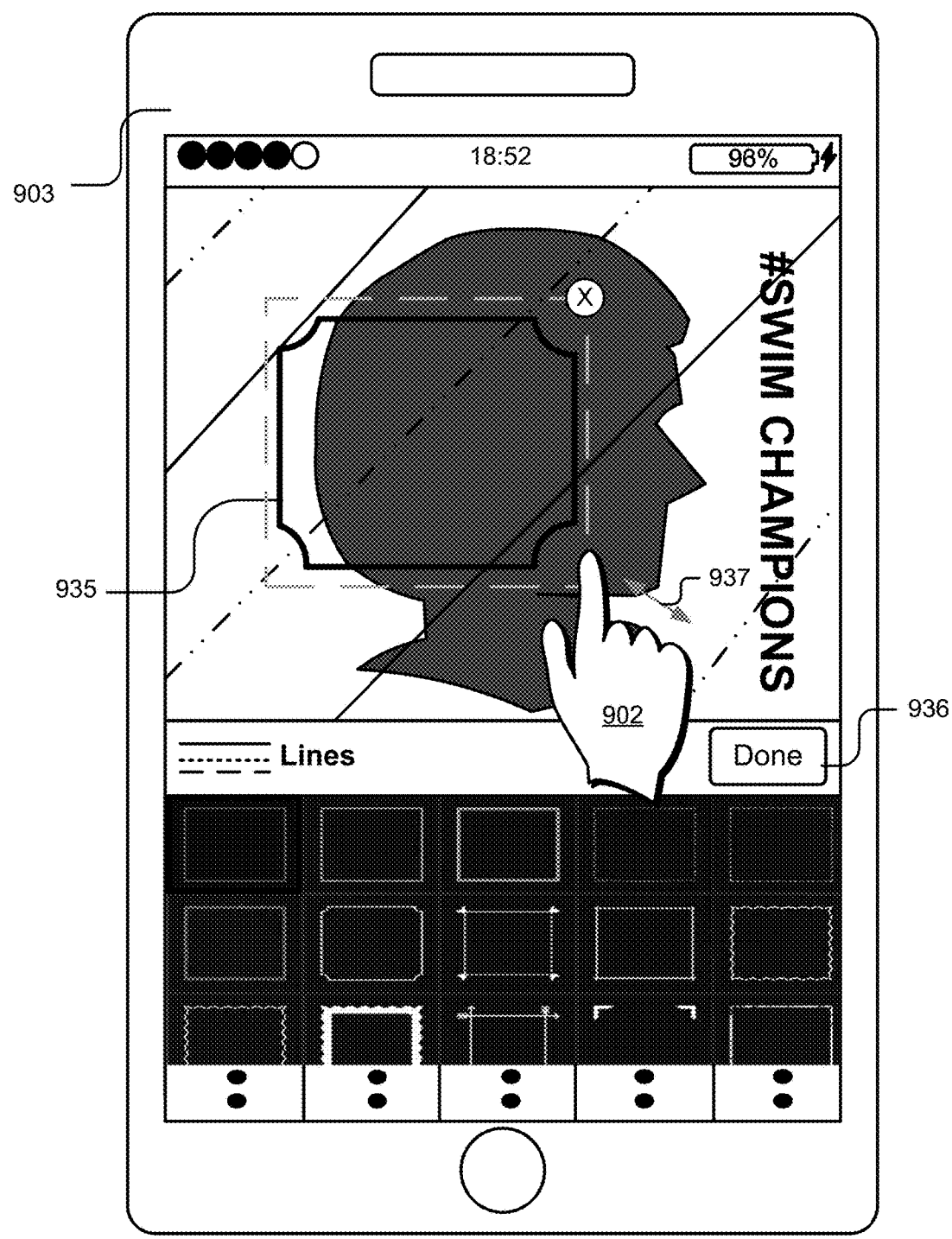
Figure 9H:
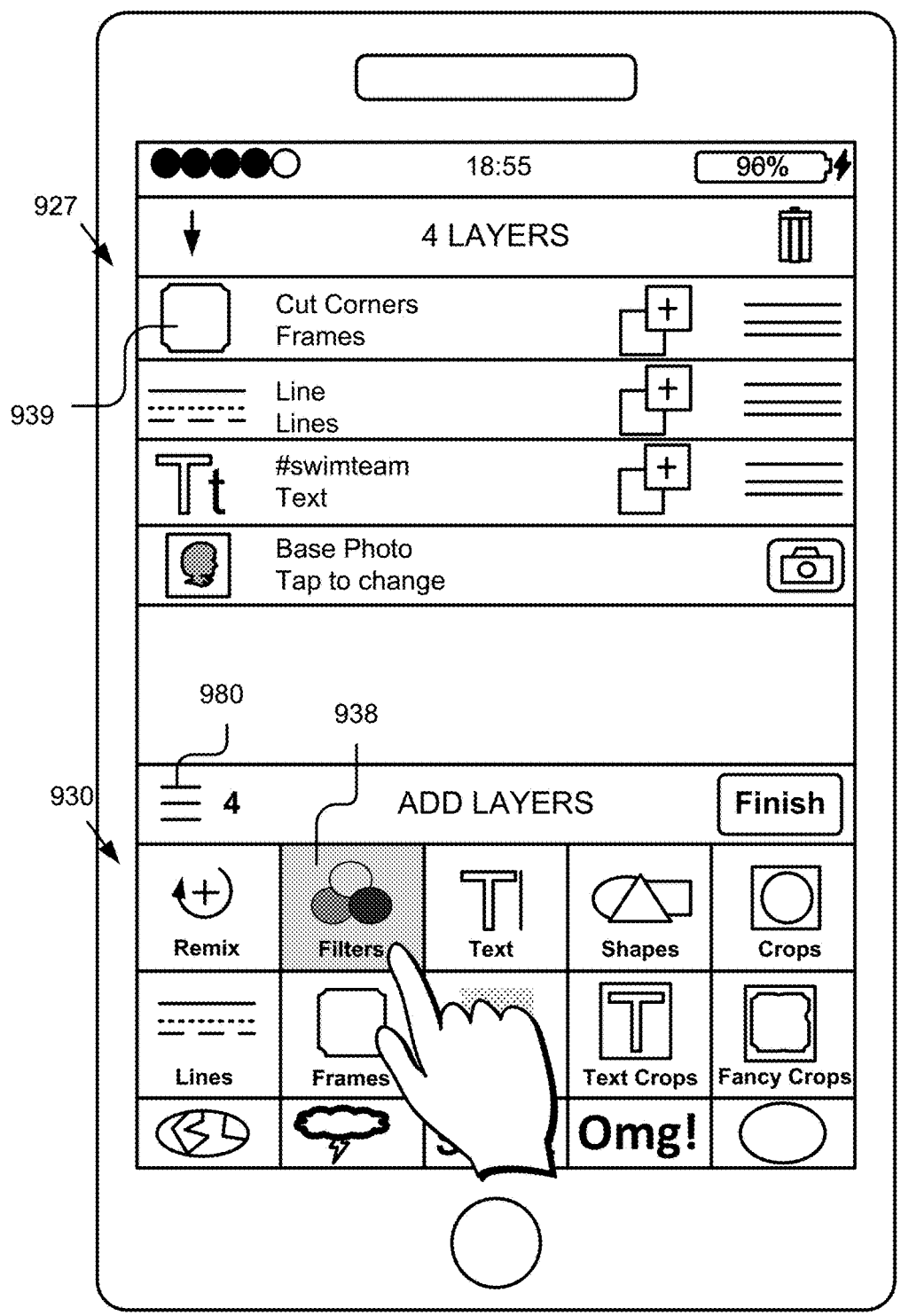
Figure 9I:
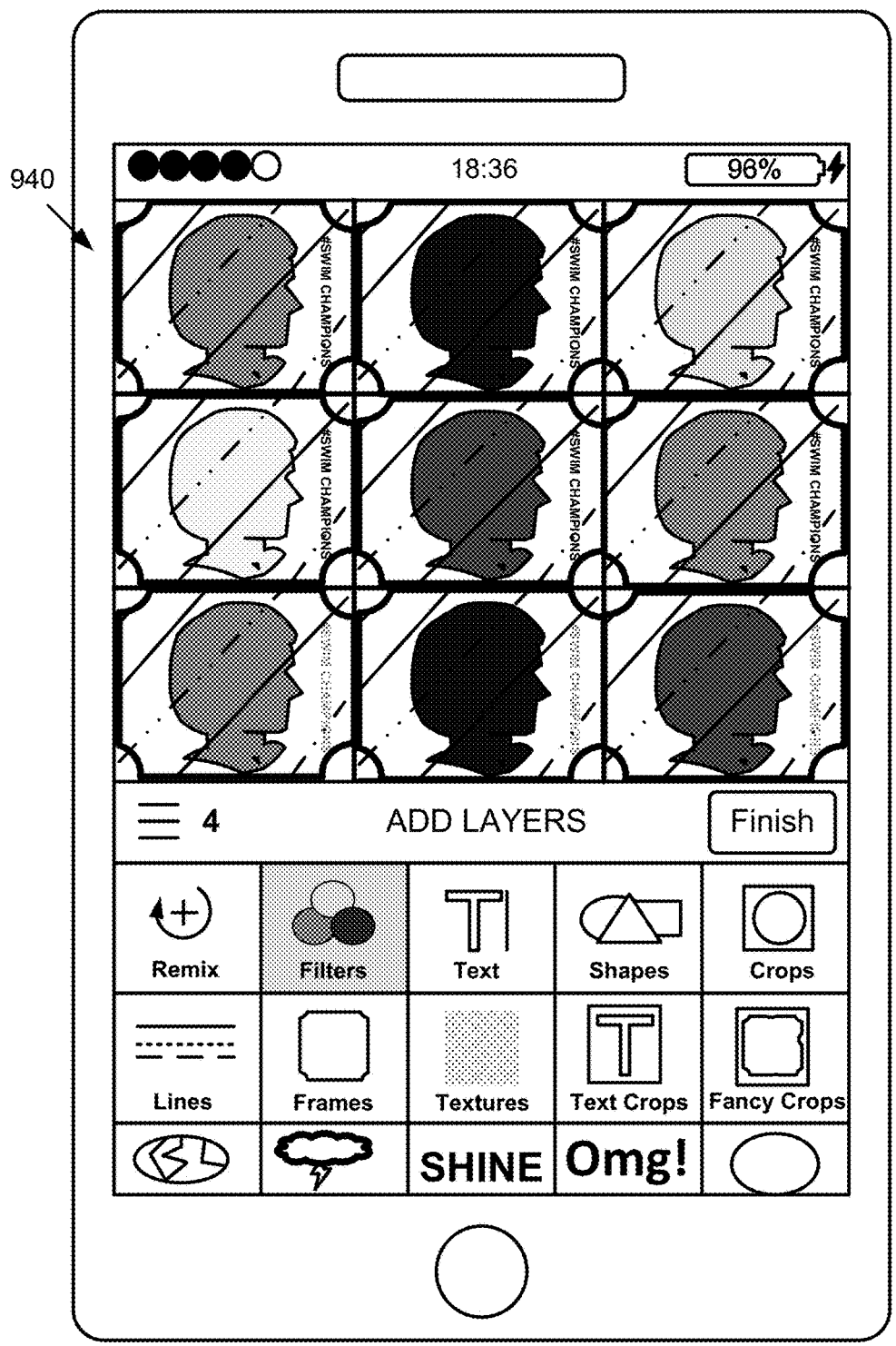
Figure 9J:
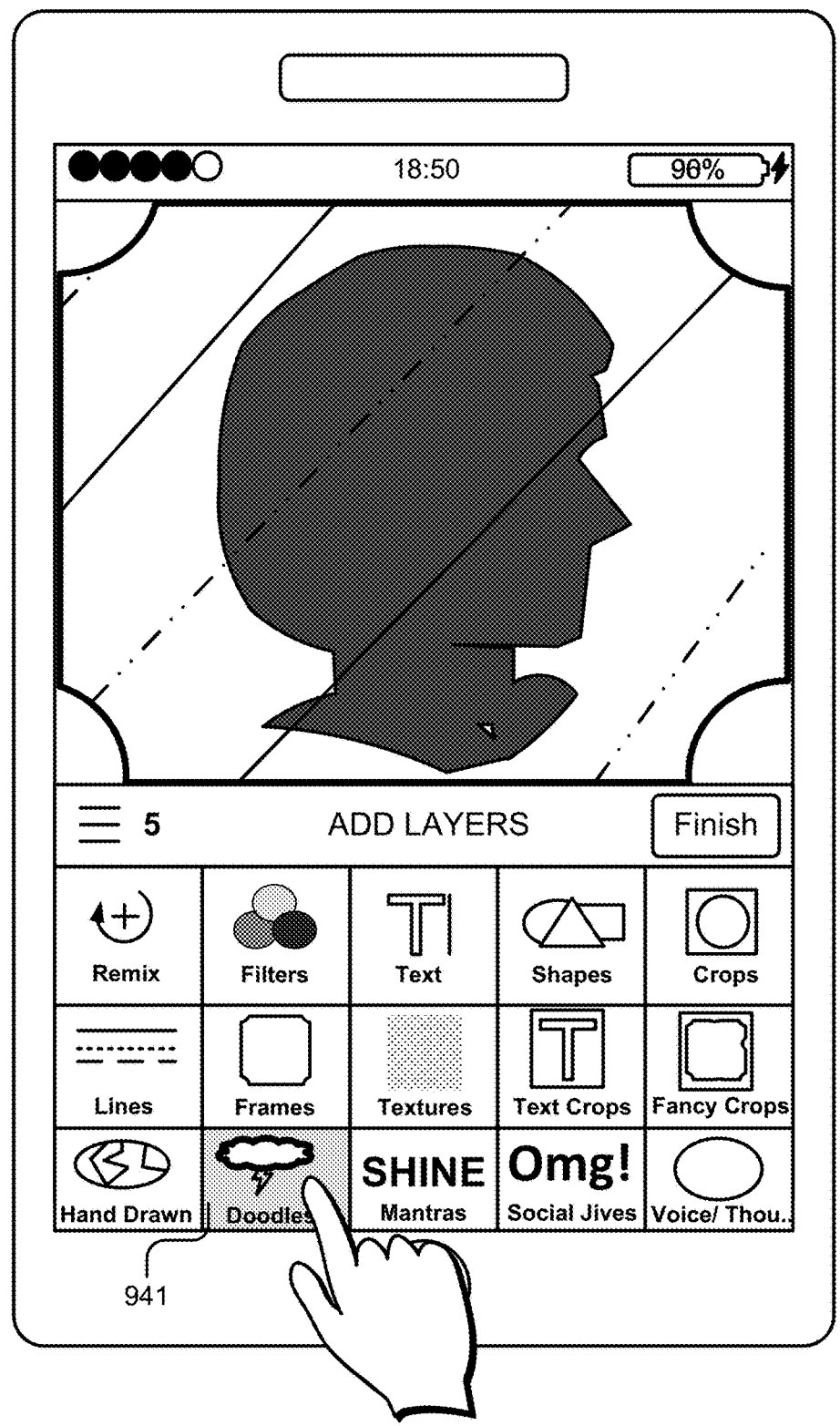
Figure 9K:
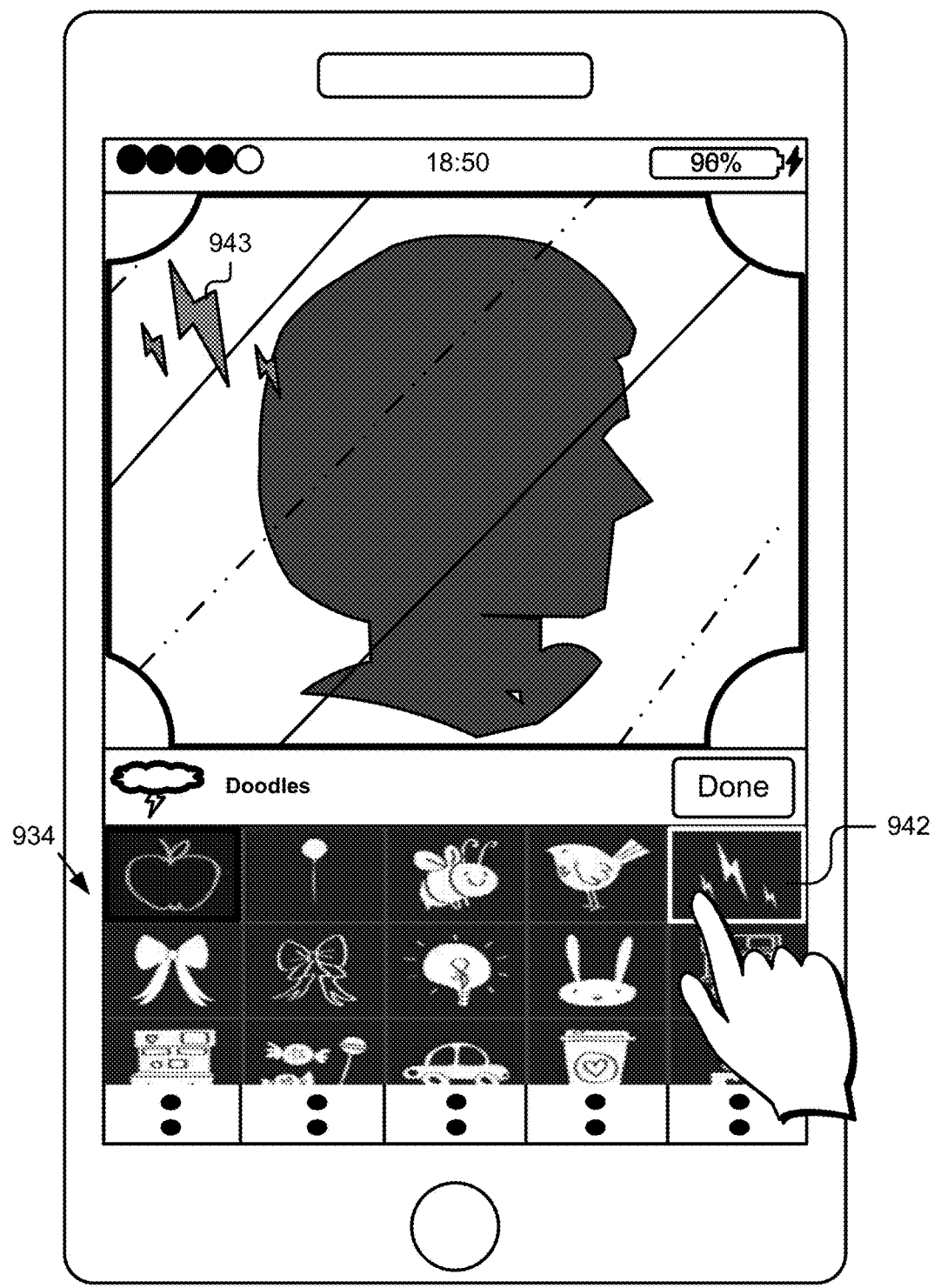

In some implementations, the design application 108 may generate and present various user interfaces to perform these acts and/or functionality, which may in some cases be based at least in part on information received from the content server 116 and/or one or more of the servers 122 via the network 102. Non-limiting example user interfaces that may be generated for display by the design application 108 are depicted in FIGS. 9A-9V. In some implementations, the design application 108 is code operable in a web browser, a native application (e.g., mobile app), a combination of both, etc. Additional structure, acts, and/or functionality of the client devices 106 and the design application 108 are described in further detail below with reference to at least FIG. 3.

The content server 116 and the servers 122 may include one or more computing devices having data processing, storing, and communication capabilities. For example, these entities 116 and 122 may include one or more hardware servers, virtual servers, server arrays, storage devices and/or systems, etc., and/or may be centralized or distributed/cloud-based. In some implementations, these entities 116 and/or 122 may include one or more virtual servers, which operate in a host server environment and access the physical hardware of the host server including, for example, a processor, memory, storage, network interfaces, etc., via an abstraction layer (e.g., a virtual machine manager).

In the depicted implementation, the content server 116 may include a content engine 118 embodying a collaborative design platform. The content engine 118 may be operable to receive, store, and/or manage designs created by the users, enable users to create and manage user accounts, share designs created by users, distribute the designs to other users as appropriate, etc. The content engine 118 may send data to and receive data from the other entities of the system including the design applications 108 and application engines 124 via the network 102. It should be understood that the content server 116 is not limited to providing the above-noted acts and/or functionality and may include other network-accessible services. In addition, while a single content server 116 is depicted in FIG. 1, it should be understood that one or more content servers 116 may be included. Additional structure, acts, and/or functionality of the content engine 118 is further discussed below with reference to at least FIG. 2.

The servers 122a . . . 122n (also referred to individually and collectively as 122), as depicted, respectively include application engines 124a . . . 124n (also referred to individually and collectively as 124). An application engine 124 may include software, logic, and/or routines operable by a server 122 to provide various services such as social networking; email; blogging; micro-blogging; photo management; video, music and multimedia hosting, distribution, and sharing; cloud-based data storage and sharing; a combination of one or more of the foregoing services; or any other service where users retrieve, collaborate, and/or share information.

In some implementations, the design application 108, content engine 118, and/or application engine 124 may require users 112 to be registered to access the acts and/or functionality provided by them. For example, to access various acts and/or functionality provided by the design application 108, content engine 118, and/or application engine 124, these components may require a user 112 to authenticate his/her identity (e.g., by confirming a valid electronic address). In some instances, these entities 108, 118, and/or 124 may interact with a federated identity server (not shown) to register/authenticate users 112. Once registered, these entities 108, 118, and/or 124 may require a user 112 seeking access to authenticate by inputting credentials in an associated user interface.

Additional acts, structure, and/or functionality of at least the client devices 106, the content server 116, the servers 122, and their constituent components are described in further detail below.

It should be understood that the system 100 illustrated in FIG. 1 is representative of an example system for collaborative design, and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 100 may be integrated into to a single computing device or system or additional computing devices or systems, etc.

Figure 2:
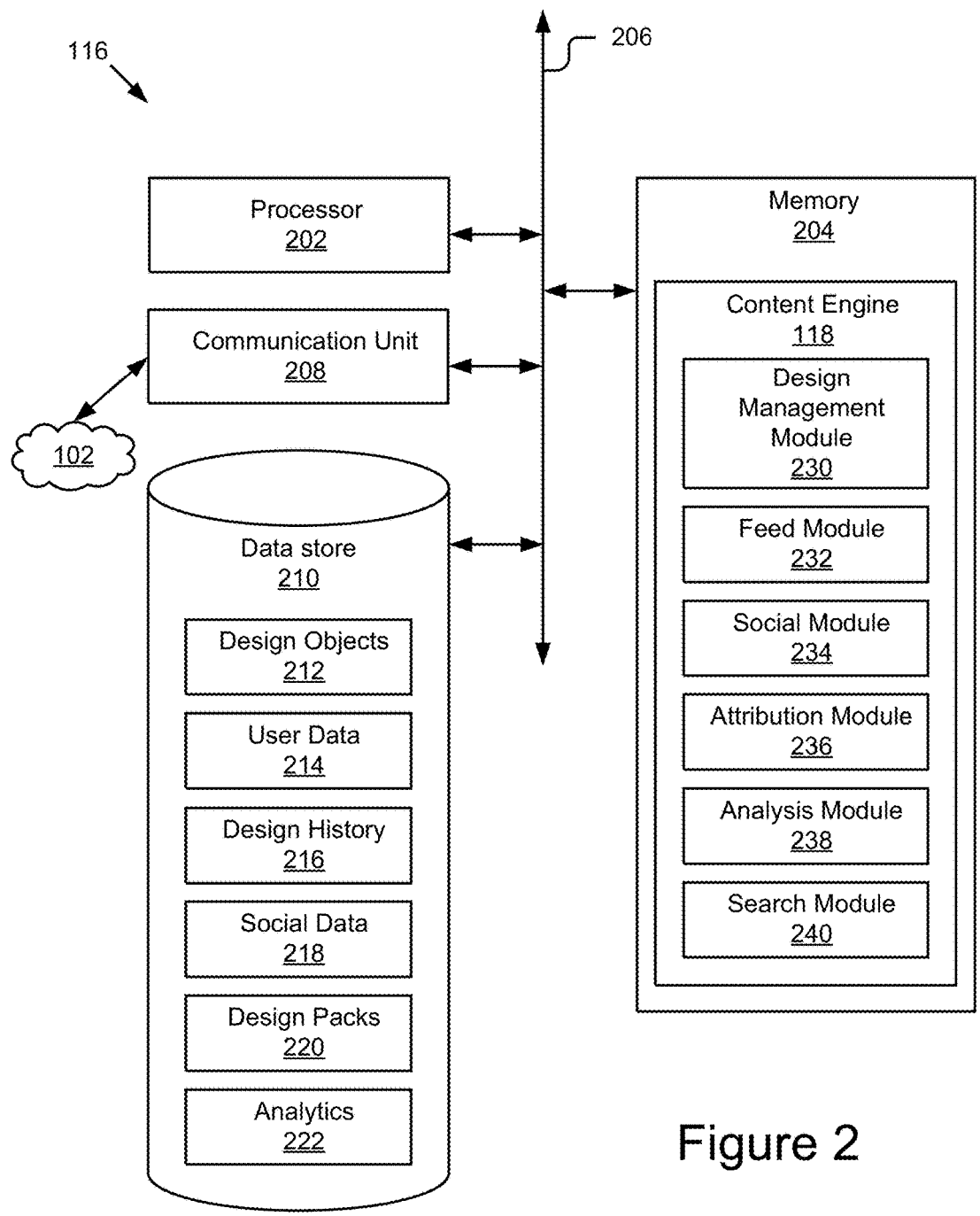
FIG. 2 is a block diagram illustrating an example client device.
Figure 3:
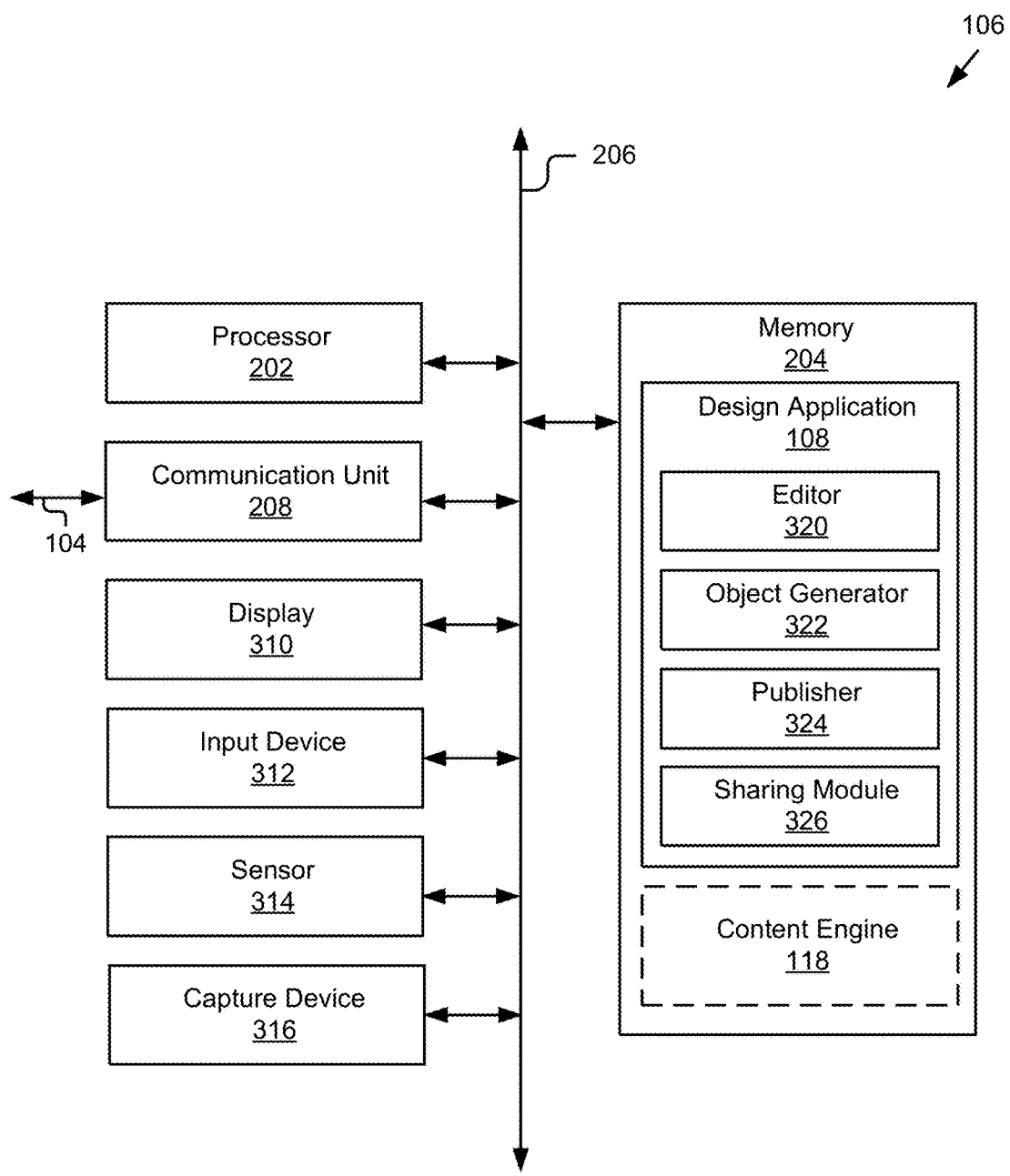
FIG. 3 is a block diagram illustrating an computing device.

FIG. 2 is a block diagram of an example content server 116 and FIG. 3 is a block diagram of an example client device 106. The server 116, as depicted in FIG. 2, may include a processor 202, a memory 204, a communication unit 208, and a data store 210, which may be communicatively coupled by a communications bus 206. The client device 106, as depicted in FIG. 3, may include a processor 202, a memory 204, a communication unit 208, a display 310, an input device 312, a sensor 314, and a capture device 316.

The content server 116 depicted in FIG. 2 and the client device 106 depicted in FIG. 3 are provided by way of example and it should be understood that they may take other forms and include additional or fewer components without departing from the scope of the present disclosure. For example, while not shown, the content server 122 may include input and output devices (e.g., a computer display, a keyboard and mouse, etc.), various operating systems, sensors, additional processors, and other physical configurations. Additionally, it should be understood that the computer architecture depicted in FIG. 2 could be applied to the other entities of the system 100 with various modifications, including, for example, the servers 122.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device, supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. In FIG. 2, the bus 206 may couple the processor 202 to other components of the server 122 including, for example, the memory 204, the communication unit 208, and the data store 210. In FIG. 3, the bus 206 may couple the processor 202 to other components of the client device 106 including, for example, the memory 204, the communication unit 208, the display 310, the input device 312, the sensor 314, and the capture device 316.

The memory 204 may store and provide access to data to the other components of the content server 116 in FIG. 2 or the client device 106 in FIG. 3. In some implementations, the memory 204 may store instructions and/or data that may be executed by the processor 202. For example, as depicted in FIG. 2, the memory 204 may store the content engine 118, and, as depicted in FIG. 3, may store the design application 108. Additionally or alternatively, in various implementations, the memory 204 of the client device 106 may include the content engine and/or one or more components thereof, as shown in FIG. 2. In further instances, the content engine 118 and/or one or more components thereof may be included in the design application 108 and/or incorporated into another application operable by the client device 106. In various implementations, the content engine 118 and/or one or more components thereof may be stored and operable by the server 116 as depicted in FIG. 3 and/or another computing device of the system 100.

The memory 204 is also capable in various implementations of storing other instructions and data, including, for example, operating systems, hardware drivers, other software applications, databases, etc. The memory 204 may be coupled to the bus 206 for communication with the processor 202 and the various other components depicted in FIGS. 2 and 3. In an implementation where the architecture of FIG. 3 resembles at least in part a server 122, the memory 204 may store the application engine 124, which may be executable by the processor 202 to provide its various acts and/or functionality.

The memory 204 includes a non-transitory computer-usable (e.g., readable, writeable, etc.) medium, which can be any tangible apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™, etc.). It should be understood that the memory 204 may be a single device or may include multiple types of devices and configurations.

The bus 206 can include a communication bus for transferring data between components of a computing device or between computing devices, a network bus system including the network 102 or portions thereof, a processor mesh, a combination thereof, etc. In some implementations, the content engine 118 and various other software operating on the content server 116 (e.g., an operating system, device drivers, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using Wi-Fi™, Bluetooth®, cellular communications, etc.; USB interfaces; various combinations thereof; etc. The communication unit 208 may include radio transceivers (4G, 3G, 2G, etc.) for communication with the mobile network 103, and radio transceivers for WiFi™ and close-proximity (e.g., Bluetooth®, NFC, etc.) connectivity. The communication unit 208 may connect to and send/receive data via the mobile network 103, a public IP network of the network 102, a private IP network of the network 102, etc. In some implementations, the communication unit 208 can link the processor 202 to the network 102, which may in turn be coupled to other processing systems. The communication unit 208 can provide other connections to the network 102 and to other entities of the system 100 using various standard network communication protocols, including, for example, those discussed elsewhere herein.

The data store 210 is an information source for storing and providing access to data. In some implementations, the data store 210 may be coupled to the components 202, 204, and/or 208 of the content server 116 via the bus 206 to receive and provide access to data. In some implementations, the data store 210 may store data received from other elements of the system 100 include, for example, the application engines 124 and/or the design applications 108, and may provide data access to these entities. In the depicted implementation, the data store 210 may store, among other data, design objects 212, user data 214, design history 216, social data 218, design packs 220, and analytics 222. The design objects 212 represent designs curated by users; the user data 214 includes user profiles and settings; the design history 216 includes the creation and remix history for the designs and attribution data attributing remixed designs to the designs that they are remixed from; the social data 218 includes connection data describing social connections between the users of the design platform, the content shared between the users of the design platform, etc.; the design packs 220 include packs of design elements that are used by the users of the design platform in their designs; and the analytics 222 describe design-related metrics including influence, penetration, remixing, usage, etc.

The data store 210 may be included in the content server 116 or in another computing device and/or storage system distinct from but coupled to or accessible by the content server 116. The data store 210 can include one or more non-transitory computer-readable mediums for storing the data. In some implementations, the data store 210 may be incorporated with the memory 204 or may be distinct therefrom. In some implementations, the data store 210 may include a database management system (DBMS) operable on the content server 116. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

In a further example, the data store 210 and/or the memory 204 may comprise non-transitory tangible computer-readable storing data structures comprising first metadata for a plurality of graphical layers of a first layered image comprising an initial graphical design; a first flattened image of the initial graphical design; second metadata for a plurality of graphical layers of a second layered image comprising a remixed version of the initial graphical design; and a second flattened image of the remixed version of the initial graphical design. Additionally, the data structures may include attribution data attributing the remixed version of the graphical design to the initial graphical design, a first base media layer of the first layered image, a second base media layer of the second layered image, and/or any of the other described herein. These data structures may be used by the system 100 to provide the users with a rich collaborative design experience as discussed elsewhere herein, such as facilitating further remixing of the initial graphical design and/or the remixed version of the initial graphical design; generation of analytics describing the evolution of the design over time; tracking of user attribution of the design; etc., as discussed elsewhere herein.

As depicted in FIG. 2, the content engine 118 may include a design management module 230, a feed module 232, a social module 234, an attribution module 236, an analysis module 238, and a search module 240. The components 230, 232, 234, 236, 238, and/or 240 may be communicatively coupled by the bus 206 and/or the processor 202 to one another and/or the other components 204, 208, and/or 210 of the content server 116. In some implementations, one or more of the components 230, 232, 234, 236, 238, and/or 240 are sets of instructions executable by the processor 202 to provide their acts and/or functionality. In some implementations, one or more of the components 230, 232, 234, 236, 238, and/or 240 are stored in the memory 204 of the content server 116 and are accessible and executable by the processor 202 to provide their acts and/or functionality. In any of the foregoing implementations, these components 230, 232, 234, 236, 238 and/or 240 may be adapted for cooperation and communication with the processor 202 and the other components of the content server 116.

The design management module 230 includes software, logic, and/or routines executable to manage designs created by users, receive and store designs, share designs, retrieve and provide designs to users for viewing and/or remixing, etc. In some implementations, the design management module 230 may be coupled to the design applications 108 to receive and provide design-related data, and cooperate with the design applications 108 to create and a remix designs based on design input provided by the users. In an example, the design-related data may include metadata describing design layers, design elements (e.g., graphical images), media objects (e.g., base layer images, flattened media objects, etc.), design packs, interaction data, etc.

The design management module 230 may provide marketplace data to the design applications 108 via the network 102. The marketplace data may indicate various new remixable designs and/or design packs that have been posted by other users for use by the design community associated with the design platform. In some implementations, some designs and/or design packs associated with the marketplace may be associated with particular purposes, businesses, movements, organizations, etc. For example, a given entity may sponsor particular design and/or design pack, which may be promoted via the marketplace. For instance, a sponsored design and/or design pack may be promoted in a prominent location within an interface presented by the design application. In a further example, a design pack may be provided in the marketplace for real-time purchase by the users, and a given user that is interested in a particular design or design pack may select that design or design pack for purchase and complete an in-application purchase for that item using the design application. In this example, the design management module 230 may include a transaction module that can process the purchase (e.g., either independently or in association with the payment processor). In a further example, some or all of the items in the marketplace may be freely accessible and usable by the users.

The design management module 230 may be coupled to the data store 210 to retrieve, store, update, delete, and/or otherwise manipulate design objects 212, marketplace data, and/or other data related to the acts and/or functionality that it performs.

The feed module 232 includes software, logic, and/or routines executable to generate and provide design streams (also called feeds) to users. In some implementations, the feed module 232 may receive a request for a design stream from a design application 108, identify the user associated with the request (e.g., via a user identifier), retrieve various designs for the design stream, and transmit the design stream to the client device 106 of the requesting user via the network 102 for display by the user's design application 108.

In some implementations, the design stream may include personalized designs, designs that are popular on the design platform, designs that are sponsored by various users, such as a business or organization, and/or undiscovered designs that the user has not yet seen but may be interested in (e.g., based on the types of the designs user is viewed in the past, types of users the requesting user is connected to in the social data 218, or other suitable indicators, etc.). As a further example, the feed module 232 may cooperate with the social module 234 to determine which other users the requesting user is connected to in the social data 218, and use the identities of those users to determine which designs associated with those users to include in the requesting user's content stream.

In some implementations, some or all aspects of the design streams may be pre-generated and cached in the data store 210 for quick access and provision at query time. In further implementations, some or all aspects of the design streams may be generated dynamically at query time.

The feed module 232 may be coupled to the data store 210 to retrieve, store, update, delete, and/or otherwise manipulate feed data, design objects 212, marketplace data, and/or other data related to the acts and/or functionality that it performs.

The social module 234 includes software, logic, and/or routines executable to provide a social network. In particular, the social module 234 may store, update, and otherwise maintain the social data 218 stored in the data store 210. The social data 218 indicates how the users of the design platform are connected. Users of the design platform may be connected by varying degrees based on common attributes. These attributes may indicate common aspects between the users, such as interests, similarities, preferences, demographics, etc. The affinity between the users may be quantified based on the strength of the connections between them. For instance, first-degree connections may indicate the users expressly followed one another on the design (e.g., selected an interface element for following other users). Second-degree connections indicate the users are implicitly connected, such as via a common first-degree connection and/or other significant commonalities.

Other more tangential degrees of connection, such as third-degree connections and beyond may be determined based on the number of commonalities between aspects of user profiles of users. For example, user profiles may indicate design preferences, design history, design browsing history, favorite/liked designs, demographics (e.g., age, gender, ethnicity, religious preference, etc.), etc., and the social module 234 may determine the strength of the affinity between users based on the number of these aspects that the users have in common. The social data 218 may indicate these commonalities and the social module 234 may use this data to determine the strength of the affinities, and thus the degree of separation between users on the social network. In some implementations, this may be determined in real-time or may be determined at various intervals and stored as a social data 218 in the data store 210 for later access and/or retrieval.

The social module 234 may receive and process social requests from a given design application 108 and provide corresponding responses back to the design application 108. For example, the social module 234 may receive a request by given (e.g., first) user to follow another (e.g., second) user on the design platform. The request may specify the identity of the second user, and the social module 234 may use this information to connect the first user to the second user. In some implementations, authorization from the second user may first be needed before the first user is connected to the second user. For instance, the social module 234, the feed module 232, or another module of the content engine 118 may provide a notification of the request to the second user via the design application 108 or another suitable application requesting authorization to allow the first to follow the second user. In some implementations, the second user may have a public profile and as such, authorization may not be necessary. The preference for a public or private profile may be stored in the user data 214. In further implementations, the visibility of the designs may be managed on a per-design basis and authorization to follow a user may be determined on a case-by-case basis.

The other modules of the content engine 118 may leverage the social data 218 to rank, organize, select, and/or otherwise socialize the data being provided to the design applications 108, and may receive the requisite social data 218 from the social module 234 and/or the data store 210. This is advantageous as it can provide a design ecosystem to the users that is familiar, relevant, and/or personalized.

The attribution module 236 includes software, logic, and/or routines executable to track attribution of the designs as they are created and remixed using the design platform. In some implementations, when a user curates a design using the design application 108, and the design management module 230 receives data related to the curation of the design, such as the design object itself, and records data describing the curation of the design (e.g., creation/remixing data, creator, design object ID, timestamp of curation, etc.) as design history data 216. As a further example, as the design is remixed by the same or other users, the design management module 230 stores data logging each instance of the design being remixed in the data store 210 has design history data 216. The attribution module 236 can utilize this design history data 216 to determine how the design has evolved over time and which user(s) a particular design should be attributed to. The attribution information for a design is particularly advantageous from a copyright perspective should a determination need to be made as to how royalties for use of the design should be divided and paid, as discussed elsewhere herein.

In some implementations, users may utilize design elements from design packs provided by other users. For example, a given design may utilize a design element depicting an image of the sun that was selected from a design pack called landscape which, in addition to the image of the sun, may include other landscape design elements such as mountains, flowers, grass, etc. As a design elements are incorporated into a given design, the attribution module 236 may track their incorporation based on the design history data 216 for that design, and then properly attribute credit to the users (e.g., associated with the design pack) that the design was inspired by. It should be understood that, as a design evolves and multiple users have provided design inputs, the attribution module 236 can accurately determine which user(s) each aspect of the design should be attributed to based on the design history 216 for that design.

In some implementations, the attribution module 236 can manage the appropriate royalty payments based on who the proper owners of the design are (e.g., as reflected by the design history 216) and the terms of an applicable copyright license, which may be stored in the data store 210 for retrieval and interpretation by the attribution module 236. In these implementations, the attribution module 236 may be coupled to a transaction module (not shown) configured to receive payments for use of copyrighted designs by the users of the design platform and/or disperse payments to financial accounts of the copyright holders/users of the design platform. The transaction module can be included in an application engine 124, the activation module 236, another module of the content engine 118, and/or another suitable component of the system 100.

The analysis module 238 includes software, logic, and/or routines executable to generate various analytics describing design and/or design pack-related usage, remixing, penetration, revenues, etc. In some implementations, the analysis module 238 may generate the analytics based on the design history 216, the user data 214, and/or the social data 218. For example, an entity may sponsor a particular design and release it via the marketplace and/or other menus of the design application 108, and the feed module 232 and/or another module of the content engine 118, such as the design management module 230, may receive interaction data from design application 108 indicating when the design has been interacted with (e.g. viewed, favorited, etc.) and store the interaction data in the data store 210 in association with the design. In addition, the design management module 230 may receive requests by users to remix the sponsored design, and the design management module 230 may provide design-related data to the design application 108 so the design application 108 can construct a new version/make a copy of the sponsored design for the user to remix. In association with this, the design management module 230 may log a request to remix the sponsored design, as well as the changes that were made to the sponsored design, in the data store 210 as design history data 216.

In this example, the analysis module 238 may utilize the interaction data and/or the design history data 216 to determine how many times a design has been viewed and/or remixed, how many users the design has reached (e.g., viewed the design), how many users have selected to remix the design but did not complete the remix, how many users successfully remix the design, etc., and provide these results for presentation.

In addition, the analysis module 238 may utilize the social data 218 to determine which users shared their remixes of the design with other users, which of those other users also interacted with and/or remixed the design (and so on and so forth), and then provide these results for presentation. For instance, the analysis module 238 may generate and provide analytics describing level of penetration the design had through the social network of the design platform and/or how the design was remixed over time. In some implementations, the design application 108, or another suitable application may receive the analytics and present them to a corresponding stakeholder (e.g., as a report), such as the creator of design, so the stakeholder can assess whether or not the objectives for the design have been reached. In the forgoing example, the social data 218 may be processed by the social module 234 and provided to the analysis module 238, or the analysis module 228 may retrieve it directly from the data store 210.

In some implementations, the analysis module 238 may determine the influence of a given design or design pack based on one or more of the above metrics. Influence may measure the level at which users were affected by the design, and can be determined based on the users' reaction to viewing the design. The algorithm used by the analysis module 238 for computing influence may consider the number of users who remixed the design; the length of the remix chain (e.g., how many consecutive users remixed either the original design or a remixed version of the design); the number of users that shared the design on one or more social networks, the reaction by the users on the social networks to the design (e.g., the number of likes, the number of reshares, etc.). As a further example, the influence metric may be determined relative to an arbitrary scale where one end of the scale represents a maximum level of influence and the other end of the scale represents a minimum level of influence (e.g., 0 to 100, where 0 is the worst score and 100 the best score).

The analysis module 238, using applicable data stored in the data store 210, may also provide analytics (e.g., statistics) for presentation describing which elements of the design pack have been used, which design/users incorporated them, how many designs include one or more elements from the design pack, how many remixed designs include one or more elements from the design pack, etc. In some implementations, the analysis module 238 may segment the design and/or design pack analytics by demographic, which is advantageous for advertisers as they often desire to target certain age groups and/or genders with various advertising, which may be embodied by a sponsored design, design pack, and/or elements thereof.

In some implementations, the analysis module 238 may reconstruct a visual representation of the design history for design including one or more of the above-noted analytics. For example, the design history may be presented in a timeline format that graphs usage levels broken down by remixes and/or shares of the original design. In some implementations, the analysis module 238 may ingest share data from another social network, such as the social network embodied by an application engine 124, to illustrate how pervasive the design is being shared within other social networks (e.g., Facebook, twitter, tumblr, etc.), the users that the design is being shared with on those networks, etc.

The search module 240 includes software, logic, and/or routines executable to search designs and design packs based on keywords provided in search queries. In some implementations, design elements in a design pack, and the design pack itself, may be associated with certain descriptors (e.g., hashtags). As a design element is incorporated into a design, the associated descriptor may be included in the metadata for the design, and then stored in the data store 210. In addition, in implementations where a design layer includes a tagline created using a font (e.g., design element) from a given design pack, the metadata may include the descriptor associated with the font and/or the design pack, as well as the words of the tagline. For instance, the design pack may have a descriptor of "#Summer," the font may be have a descriptor of "#Creative", and the text input by the user for a given design layer of a design may say "#RelaxingInTheGrass". As the design is finalized/saved/published by the user, the design application 108 may generate metadata including #Summer and/or #Creative, as well as #RelaxingInTheGrass, which the design management application 230 may store in the data store 210 in association with a design object 212. Then, in response to a later search by a user searching for a design about grass the search module 240 may match the grass keyword to the #RelaxingInTheGrass descriptor and include the design in results provided by the search module 240 to the design application 108 for display to the user. This is advantageous in implementations where a flattened media object of the design is created, stored, and/or shared because the individual layers of the design may still be searched for relevant content.

The search module 240 may be coupled to the data store 210 to query the data stored there, log searches by user, etc. The search module 240 may transmit the search results via the network 102 to the design applications 108 and/or other entities of the system 100 for presentation, and receive search queries via the network 102 from the various instances of the design application 108.

With reference to FIG. 3, the display 310 may display electronic images and data output by the client device 106 for presentation to a user 112. The display 310 may include any conventional display device, monitor or screen, including, for example, an organic light-emitting diode (OLED) display, a liquid crystal display (LCD), etc. In some implementations, the display 310 may be a touch-screen display capable of receiving input from one or more fingers of a user 112. For example, the display 310 may be a capacitive touch-screen display capable of detecting and interpreting multiple points of contact with the display surface. In some implementations, the client device 106 may include a graphics adapter (not shown) for rendering and outputting the images and data for presentation on display 310. The graphics adapter (not shown) may be a separate processing device including a separate processor and memory (not shown) or may be integrated with the processor 202 and memory 204.

The input device 312 may include any device for inputting information into the client device 106. In some implementations, the input device 312 may include one or more peripheral devices. For example, the input device 312 may include a keyboard (e.g., a QWERTY keyboard), a pointing device (e.g., a mouse or touchpad), microphone, an image/video capture device (e.g., camera), etc. In some implementations, the input device 312 may include a touch-screen display capable of receiving input from the one or more fingers of the user 112. For instance, the functionality of the input device 312 and the display 310 may be integrated, and a user 112 of the client device 106 may interact with the client device 106 by contacting a surface of the display 310 using one or more fingers. In this example, the user 112 can interact with an emulated (i.e., virtual or soft) keyboard displayed on the touch-screen display 310 by using fingers to contacting the display in the keyboard regions.

The sensor 314 may include one or more sensing devices for detecting changes in the state of the client device 106 (e.g., movement, rotation, temperature, etc.). Example sensors may include, but are not limited to accelerometers, gyroscopes, thermocouples, etc. The sensor may be coupled to the bus 206 to send the signals describing the changes it detects to the other components of the client device 106, which can be used by them to provide various acts, functionality, and information to the user 112.

The capture device 316 is a digital image capture device capable of capturing still and motion images, and sound. An example of the capture device 316 is a digital camera. The capture device 316 is coupled to the bus 206 for communication and interaction with the other components of the client device 106, and these components may interface with the capture device 316 (e.g., via a software driver executable by the processor 202) via the bus 206 to capture still and/or motion images (e.g., videos and photographs) using the capture device 316. The capture device 316 may include a lens for gathering and focusing light, a photo sensor including pixel regions for capturing the focused light and a processor for generating image data based on signals provided by the pixel regions. The processor may be integrated with the processor 202 of the client device 106 or may be separate therefrom. In some implementations, the processor of the capture device 316 is coupled via the bus 206 to store image data in the memory 204. The photo sensor may be any type of photo sensor including a charge-coupled device (CCD), a complementary metal-oxide-semiconductor (CMOS) sensor, a hybrid CCD/CMOS device, etc. The capture device 316 may include a microphone (not shown) for capturing sound or may be coupled to a microphone included in another component of the client device 106 or coupled directly to the bus 206. The capture device 316 may also include any conventional features including flash, a zoom lens, etc.

As depicted in FIG. 3, the design application 108 may include an editor 320, an object generator 322, a publisher 324, and a sharing module 326. The components 320, 322, 324, and/or 326 may be communicatively coupled by the bus 206 and/or the processor 202 to one another and/or the other components 204, 208, 310, 312, 314, and/or 316 of the client device 106. In some implementations, one or more of the components 320, 322, 324, and/or 326 are sets of instructions executable by the processor 202 to provide their acts and/or functionality. In some implementations, one or more of the components 320, 322, 324, and/or 326 are stored in the memory 204 of the client device 106 and are accessible and executable by the processor 202 to provide their acts and/or functionality. In any of the foregoing implementations, these components 320, 322, 324, and/or 326 may be adapted for cooperation and communication with the processor 202 and the other components of the client device 106.

The editor 320 includes software, logic, and/or routines executable to enable a user to compose and edit a design. In some implementations, the user may access an interface associated with the editor by selecting to create new design or remix an existing design. The editor 320 may request existing designs either created by or shared with a user from local storage and/or the content engine 118. The content engine 118 (e.g., the design management module 230) may transmit instances of these designs to the client device 106 of the user for viewing, remixing, and sharing with other users.

Figure 8:
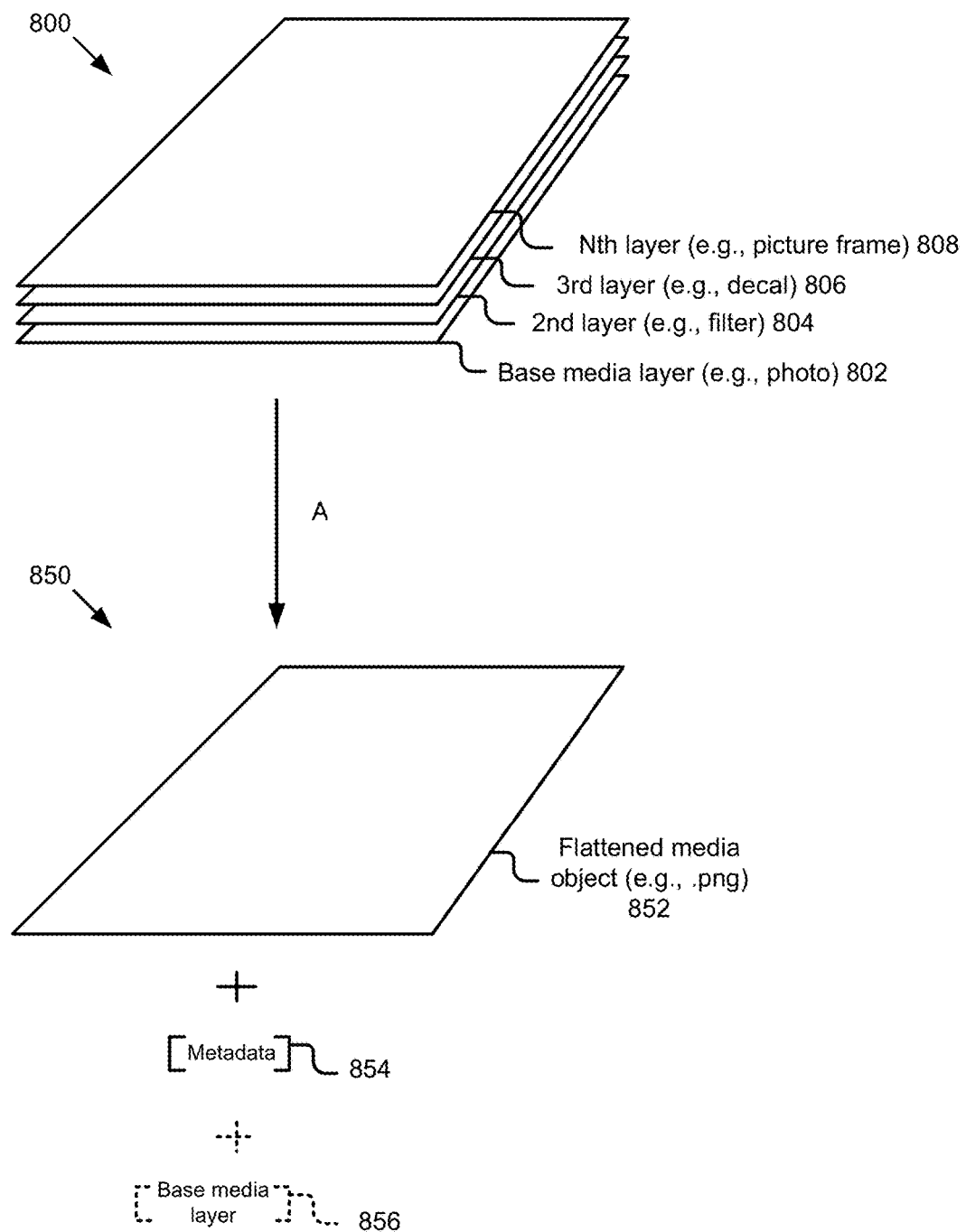
FIG. 8 is a diagram illustrating the generation of an example flattened media object and metadata from a layered design.

The editor 320 may receive design inputs from a user for a given design and may apply those inputs to the design. FIG. 8 depicts an example design 800 curated by the user. As depicted, the design 800 may include a base media layer 802, such as a photograph or a video, and any number N of additional layers that add effects or features to the base media layer 802, and which were added based on the design inputs from the user. For instance, a second layer 804 may add a filter effect, a third layer 806 may add a decal overlay that is repositionable, resizable, and includes editable text, and the Nth layer may add a frame element to the base media layer 802 (e.g., an elegant border). In a further example, a base media layer may include a single image, a collage of images (e.g., photographs, videos, etc.), a set of overlaid images (e.g., opaque/partially transparent images, texturized images, etc.). It should be understood that numerous other variations are also possible.

In some instances, the design 800, when remixed, may act as a template that includes the effect or feature layers but not the base layer when selected by other users for remixing. For instance, a user may share his/her design and other users may select to remix that design, at which point those users are prompted by the design application 108 to select their own base media layers (e.g., photographs) to apply to/use in the design. In other instances, the original base media layer may be included when remixed. In either case, these designs may be editable by the users that they are shared with and reshared with and further remixable by the original creators and others, thus allowing the design to evolve overtime. Various acts and/or functionality provided by the editor 320 for editing a design are described below with reference to at least FIGS. 6A-6E.

Once a design is complete, a user may select via an editing interface to publish the design, and responsive thereto, the design application 108 may publish the design, which includes finalizing and saving the design locally (e.g., in the memory 204) and/or remotely (e.g., in the data store 210). In some implementations, the editor 320 signals the object generator to generate a design object embodying the design.

The object generator 322 includes software, logic, and/or routines executable to generate a design object embodying the design for storage and/or sharing. The object generator 322 may be coupled to the publisher 324 and/or the sharing module 326 to provide the design objects generated by it for publishing and sharing, respectively, and/or may be coupled to the memory 204 to store the design objects for access and/or retrieval by these and/or other components.

The nature of the design object generated by the object generator 322 may be determined based on the formats supported by the design platform embodied by the content engine 118 and/or the formats supported by the social platforms (e.g., social networks). For example, for platforms (e.g., social networks) that support multidimensional image formats (e.g., vector graphics), the object generator 322 may generate design objects to comply with/use those formats. For platforms that only support flat image formats (e.g., .png, .jpg, .gif, etc.), the object generator 322 may generate design objects that comply with/use those formats.

For instance, in FIG. 8, the object generator 322 generates, as indicated by arrow A, a design object 850 that includes the layered design 800 into a flattened media object 852 (e.g., png) that omits the base media layer and incorporates the subsequent layers in some instances or incorporates the base media layer and the (e.g., all) subsequent layers in other instances. The design object also includes metadata 854 describing the layers of the layered design 800 and corresponding content.

In some implementations, the object generator 322 may flatten (e.g., rasterize) the layered design 800 using known rasterization techniques, although other suitable image conversion techniques are also contemplated. In this example, the flattened media object 852 is compatible and sharable on various sharing services (also referred to herein as data sharing platforms or publishing services) (e.g., photo management sites; social networks; websites; blogs; data storage and sharing services; business applications; etc.).

The metadata describes the layers included in the design and/or any corresponding information/content. In some implementations, the metadata includes data necessary for reconstruction of the original unflattened design 800 when it is opened in the design application 108. For instance, the editor 322 may process the metadata to determine the layers of the original design 800 and how to reconstruct them as a copy for remixing by the user. This enables users to easily collaborate and build/iterate upon each other's designs. The metadata 854 may or may not include data describing the base media layer 802 as appropriate.

The following is a non-limiting example of metadata:
{"CCFL":{"brightness":0.03750002,"contrast":
  0.3611607,"sat uration":1.53125},"filters":[{"class":
  "VintageFilterLayer","supe r":{"name":"Vintage",
  "thumbnailName":"f_t_vintage.png"}}],"o verlays":
  [{"class":"OverlayLayer","size":240,"super":
  {"alpha":

1,"color":{"alpha":1,"blue":1,"green":1,"red":1},"downloaded":t rue,"name":"Bolder","pack":"Mantras 2","rasterize":false,"transform":"[0.25753301, 0, 0, 0.25753301, 56.986794, 56.986794]","visible":true}, "svgName":"man2_boldersvg"}]}

In some implementations, the design object 850 may also include a copy 856 of the base media layer 802 of the original design 800 while in other implementations, the base media layer 802 may be omitted from the design object, as discussed elsewhere herein.

The publisher 324 includes software, logic, and/or routines executable to publish the design objects (e.g., created or remixed/iterated) by users. The publisher 324 may receive the design objects generated by the object generator 322 from the object generator 322 or local storage (e.g., memory 204) and transmit the design objects to the content engine 118 for storage and/or publication to the user's library of designs locally and/or remotely (e.g., by the content engine 118). The user may then access those designs via a library interface presented by the design application 108 for viewing, sharing, editing, and/or remixing.

In some instances, the publisher 324 may signal the object generator 322 to generate a design object for publishing. In some instances, the editor 320 may signal the object generator to generate the design object and provide it to the publisher 324 for publishing. For instance, the publisher 324 may signal the object generator 322 to generate the design object, and in response, the object generator 322 may do so by flattening the design and generating the metadata. The publisher 324 may receive the design object from the object generator 322 and/or storage and upload it via the network 102 to the content engine 118 (e.g., the design management module 230).

The publisher 324 may be configured to signal the sharing module 326 to share the published designs with other users, and responsive thereto, the sharing module 326 may execute a sharing process via one or more data sharing platforms (e.g., social networks) as described elsewhere herein. Additionally or alternatively, in some cases, when publishing a design, the publisher 324 may signal the content engine 118 to publish it publically to all users of the design platform. For instance, the feed module 232 may include a published design in the content streams of various other users by transmitting design streams to the users via their respective instances of the design application 108. In response, a user may remix (e.g., reuse and/or edit) the designs from the design stream to apply them to her/her content (e.g., photographs).

The sharing module 326 includes software, logic, and/or routines executable to share designs with other users. The sharing module 326 may leverage APIs exposed by the software embodying various data sharing platforms to share the designs with others. In some implementations, the sharing module 326 may be configured to share a given design via the social network of the design platform, and may be further configured by a corresponding user to share the design via one or more external social networks, such as social networks operated by servers 122.

In some implementations, various data sharing platforms (e.g., social networks) may only support sharing of certain media formats, such as flattened media objects (also referred to as flat media objects). In these implementations, the sharing module 326 may share the flattened media object of a design on such a data sharing platform (e.g., social network) embodied by one or more of the application engines 124. The sharing module 326 may leverage APIs exposed by the application engine 124 to share the flattened media object.

The users with which designs are shared may be socially connected to the sharing user via social networks. For instance, for a given user, the design stream provided by the feed module 232 may include the design objects of that user and the users that are connected to that user (e.g., in a social graph embodied by the social data 218), as described elsewhere herein. As a further example, a user may wish to share a design on Facebook™ that he/she created and may press a sharing button displayed by the design application 108. In response, the sharing module 326 may signal the object generator 322 to generate the flattened media object for the design if it hasn't been generated already, and then the sharing module 326 may send a request to the social network requesting the design be posted to the user's social network content stream. In some implementations, the flattened media object may be shared with a link that redirects users to the corresponding design object hosted by the content engine 118.

In some implementations, the object generator may embed a unique identifier (ID) into the media object (e.g., the flattened image) that is generated (e.g., embed exif data into a JPG image) that uniquely identifies the corresponding design object stored in data store 210. This unique ID can be utilized by a software application to link the corresponding design object, to access and or remix the design embodied by it. This is advantageous as it can allow for the creation of a link to access and/or remix the design in an situation where a link was not initially provided or the flattened image becomes separated from a link that it was provided with.

In some implementations, the sharing module 326 may signal the content engine 118 to perform the sharing on the external data sharing platforms, and the content engine 118 may carry out these operations accordingly. In further implementations, the content engine 118 may independently carry out the sharing process. The design application 108 and/or the content engine 118 may need authorization using known methods for that user to share designs via the external data sharing platforms. During the authorization process, the design application 108 may store data keys (e.g., authentication tokens) allowing design application 108 to post content to the user's accounts (e.g., feeds) on those data sharing platforms.

While certain acts and/or functionality described herein as being associated with certain modules, it should be understood that these acts and/or functionality may be performed by other modules, or a combination of two or more modules, and/or moved from a client side or server side implementation without departing from the scope of this disclosure.

Additional structure, acts, and functionality of the design application 108 as discussed in further detail below.

Figure 4:
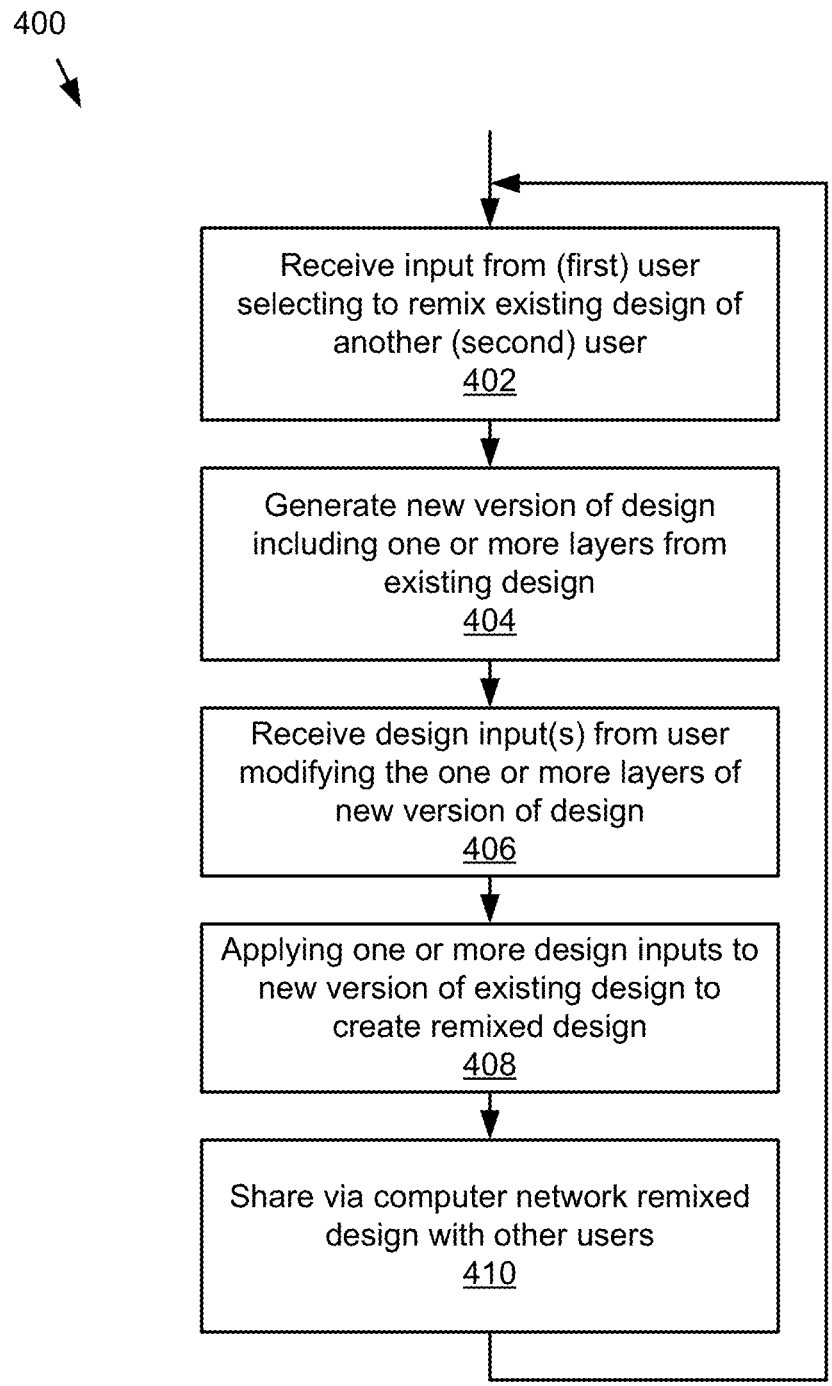
FIG. 4 is a flowchart of an example method for remixing and sharing a design.

FIG. 4 is a flowchart of an example method 400 for remixing and sharing a design. In block 402, the method 400 receives input from a (first) user selecting to remix an existing design of another (second) user and in block 404, the method generates a new version of the design including one or more layers from the existing design. For instance, the editor 320 may request that the design management module 230 retrieve the metadata corresponding to a user selection and provide it to the editor 320, which may use the metadata to reconstruct the layers of the design for editing by the user, as discussed elsewhere herein. In an example, the existing design may include a base media layer and a one or more layers comprising one or more design elements layered on the base media layer. In this example, generating the new version of the existing design may include omitting the base media layer of the existing design from the new version of the existing design. Further, the one or more design inputs may include a reference to a digital graphical image and applying the one or more design inputs may include inserting the digital graphical image into the remixed design as a base media layer for the remixed design.

In a further example, the base media layer (which may include one or more images) may be included as a layer in the new version of the existing design and, in some cases, a remixing user, using the design application 108, may insert a new base media layer underneath and/or on top of the base media layer taken from the existing design. Continuing this example, the user may edit (e.g., texturize) the base media layer taken from the existing design to add various different effects to the remixed design. Numerous other variations are also possible.

In block 406, the method 400 receives design input(s) from the first user modifying the one or more layers of the new version of the design. For example, using an interface associated with the editor 320, the first user may select to add a base media layer (e.g., by selecting a digital graphical image from local storage, capturing the digital graphical image in real-time, etc.), crop the base media layer, add filters to the base media layer, add various graphical design elements including stylized text and graphics to the base media layer, select to include one or more design elements from design packs made available via the interface, select to modify the design elements, etc. In a further example, the user could choose to apply a second (different) existing design to the one being created. In this case, the editor 320 may replace all the design elements other than the base media layer with the design elements from the second existing design or may add the design elements from the second existing design on top of elements of the design already being remixed. Numerous other variations are also possible and contemplated.

In block 408, the method 400 applies or more design inputs to the new version of the existing design to create a remixed design. For example, the editor 320 may add a base media layer, crop the base media layer, add filters to the base media layer, add various graphical design elements including stylized text and graphics to the base media layer, include one or more design elements from design packs made available via the interface, modify one or more of these design elements, etc., in accordance with the design inputs. In some implementations, the editor 320 modifies the new version of the existing design as the design inputs are being received and in accordance with those design inputs, which provides a real-time design experience to user, although other variations are possible where all the design inputs are received before they are applied to the new version of the existing design to create a remixed design.

In block 410, the method 400 shares via a computer network the remixed design with other users, as discussed elsewhere herein. The method 400 may iterate any number of times for any applicable designs available on the design platform, which allows the community of users the design platform, as well as other users with which the designs are shared, for example via social networks, to remix the designs of others, and results in providing a vibrant and creative design environment to users.

Additionally or alternatively, the method 400 may include further features as discussed elsewhere herein, such as the following list of features. The method 400 may include generating a flat media object of the remixed design from a plurality of layers comprising the remixed design, in which case sharing the remixed design with other users may include transmitting a request including the flat media object of the remixed design via a computer network to one or more social networks with an instruction to share the flat media object with one or more users connected to the second user on the one or more social networks. The method 400 can publish a design object representing the remixed design to a data store for retrieval by other users. The method 400 can render the new version of the existing design including the one or more layers for display. The method 400 can prompt the second user to provide a digital graphical image as a base media layer for the new version of the existing design and receive a design object including metadata describing the one or layers of the existing design. In this case, generating the new version of the existing design may include generating the one or more layers to include in the new version of the existing design using the metadata. Prior to the creation of the existing design, the method 400 can provide a design interface for creating designs to the second user for display; obtain a media object; receive one or more design inputs from the second user for creating the existing design; and create the existing design using the media object and the one or more design inputs received from the second user. Responsive to sharing the remixed design with one or more other users, the method 400 may receive a request from a third user to view the remixed design and providing data describing the remixed design to the third user for display. The method 400 can store attribution data in a data store attributing the remixed design to the second user, wherein providing data describing the remixed design includes providing data attributing the remixed design to the second user.

Figure 5A:
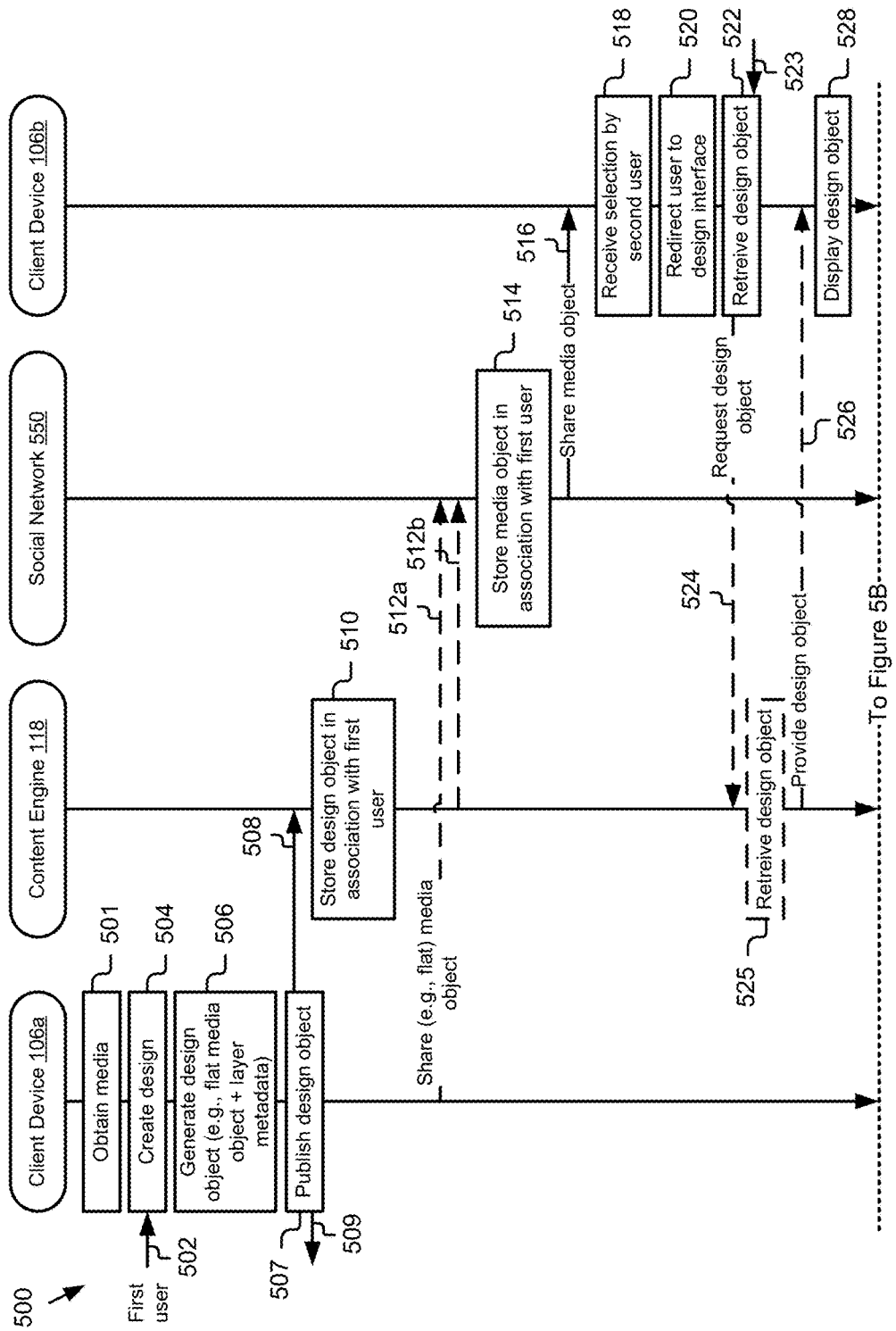
FIGS. 5A and 5B are signal diagrams of an example method for creating, sharing, and remixing a design.
Figure 5B:
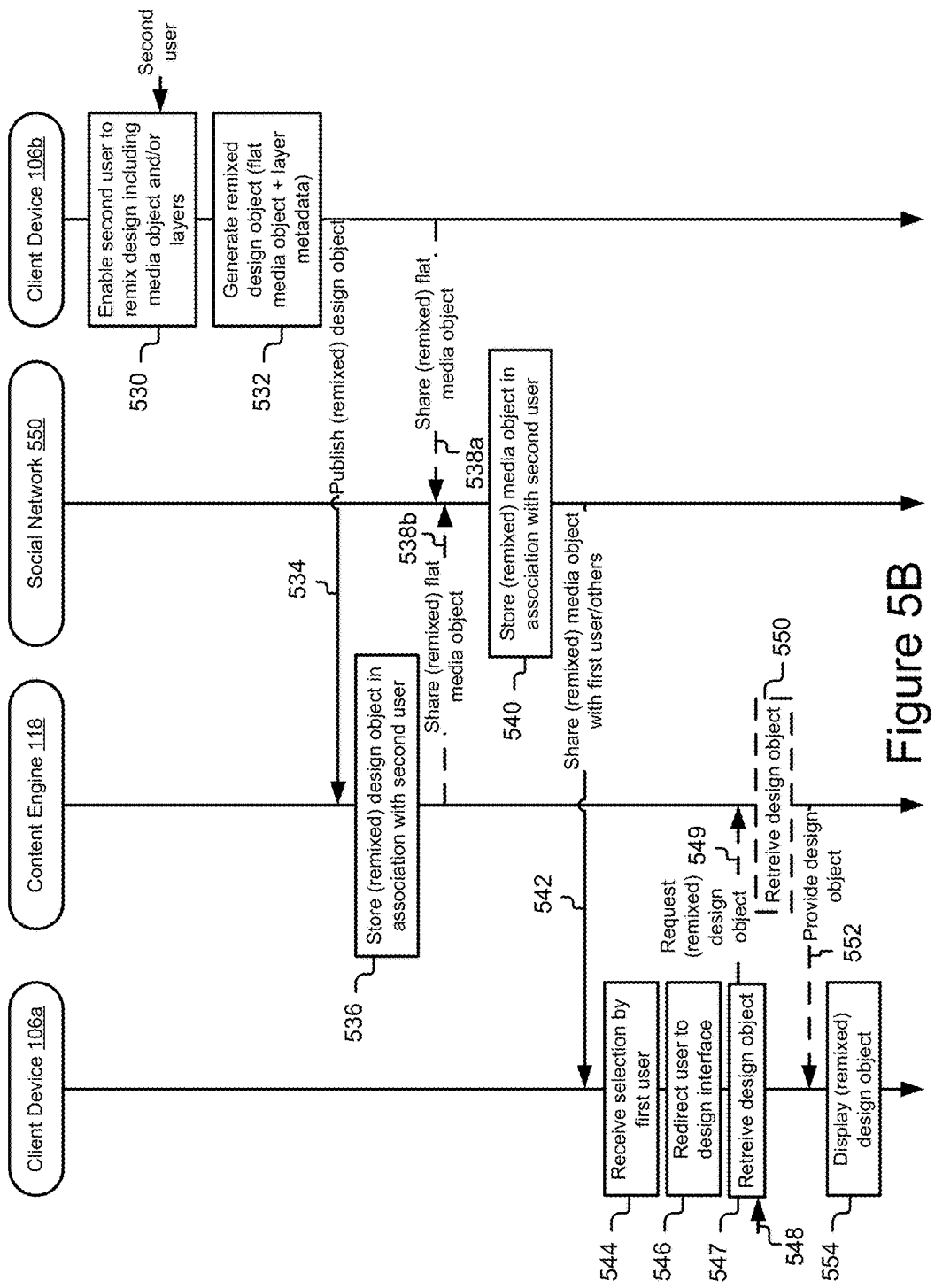
Figure 6A:
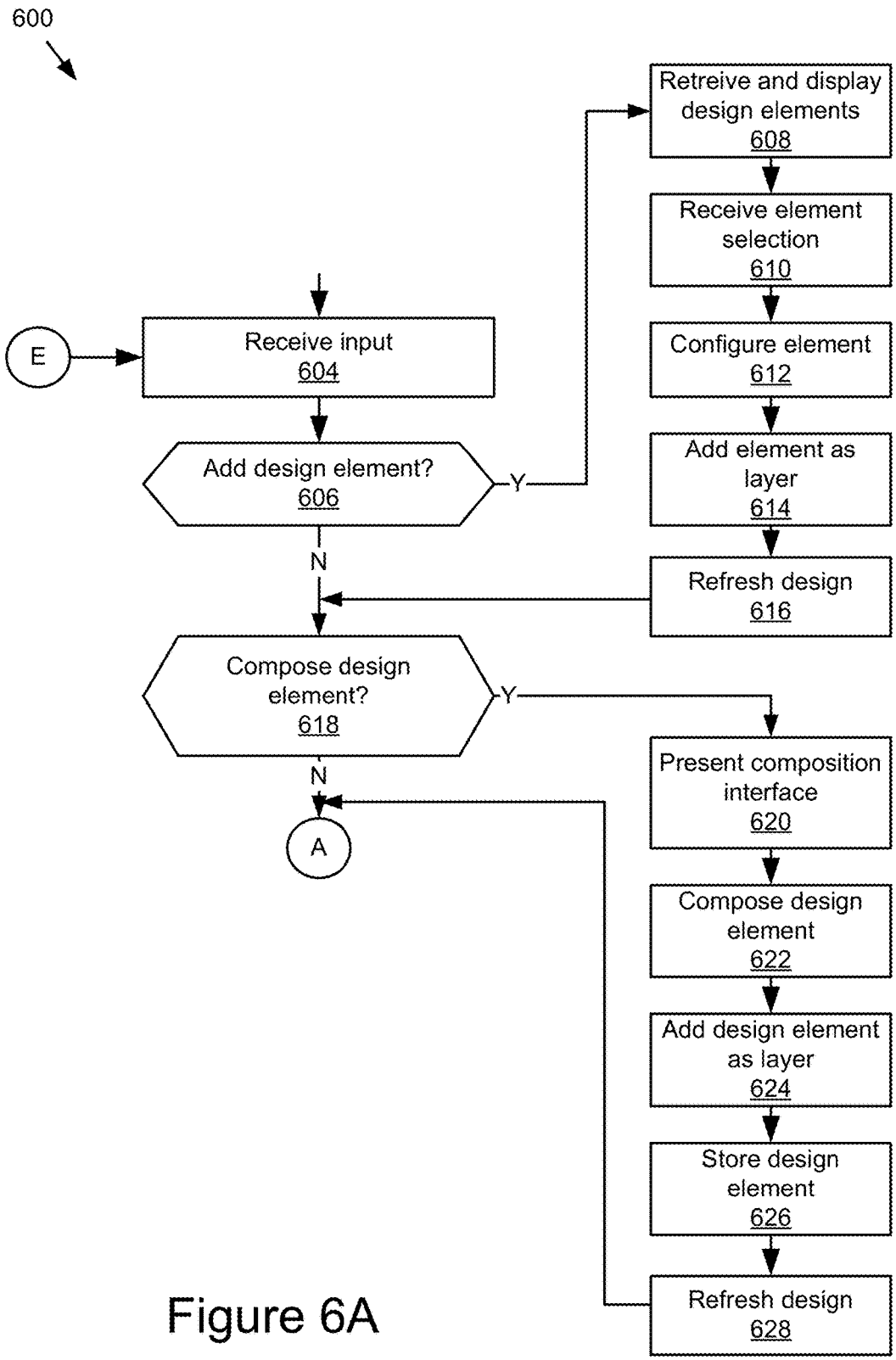
FIGS. 6A-6E are flowcharts of an example method for working with designs and design packs.
Figure 6B:
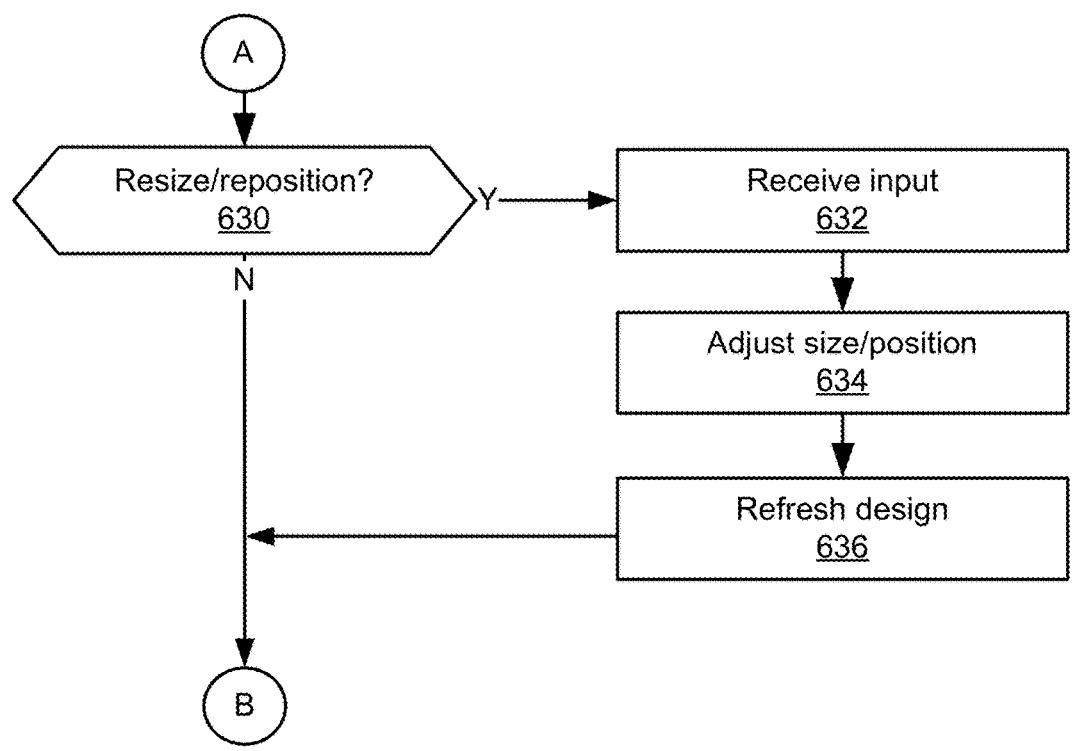
Figure 6C:
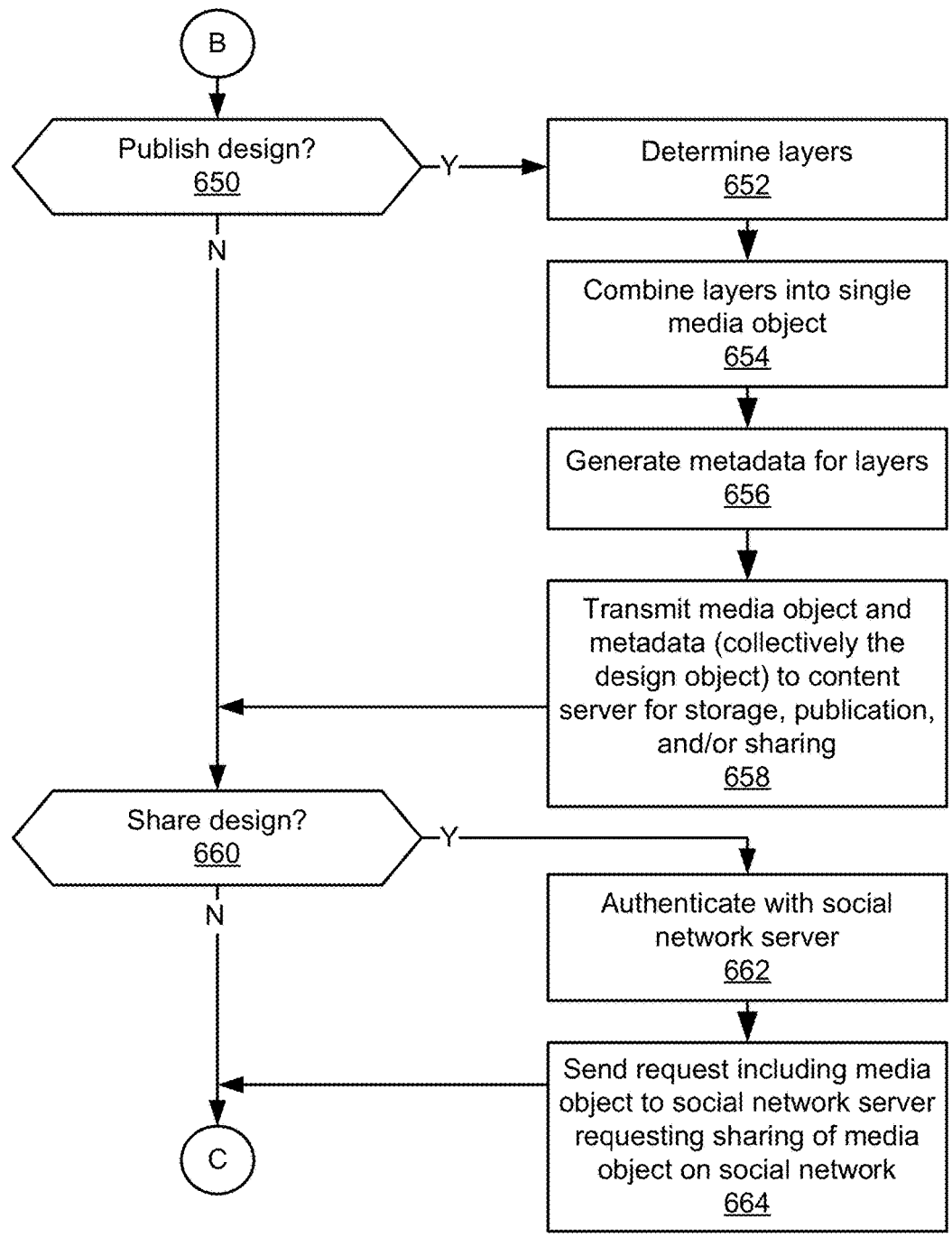
Figure 6D:
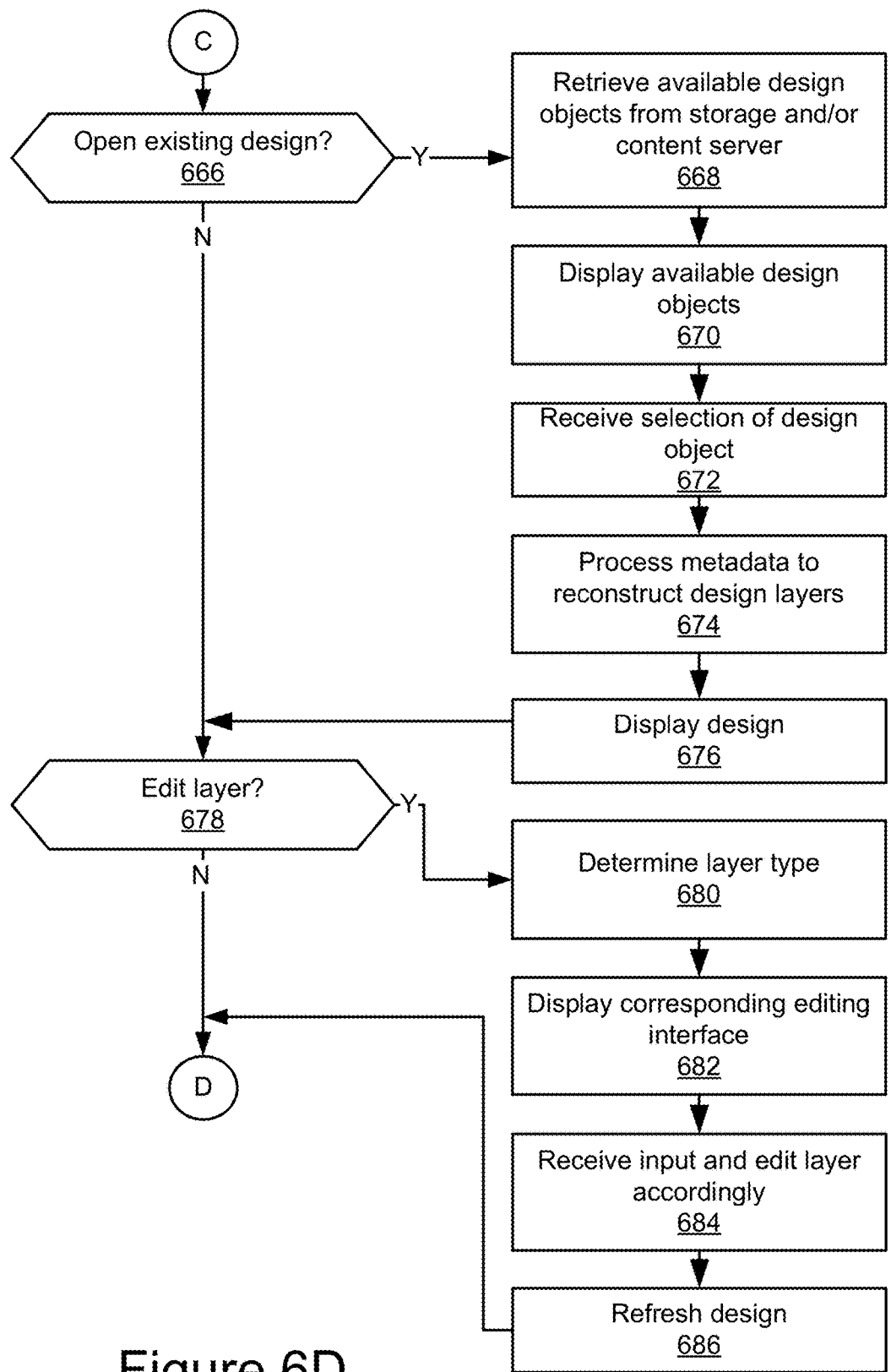
Figure 6E:
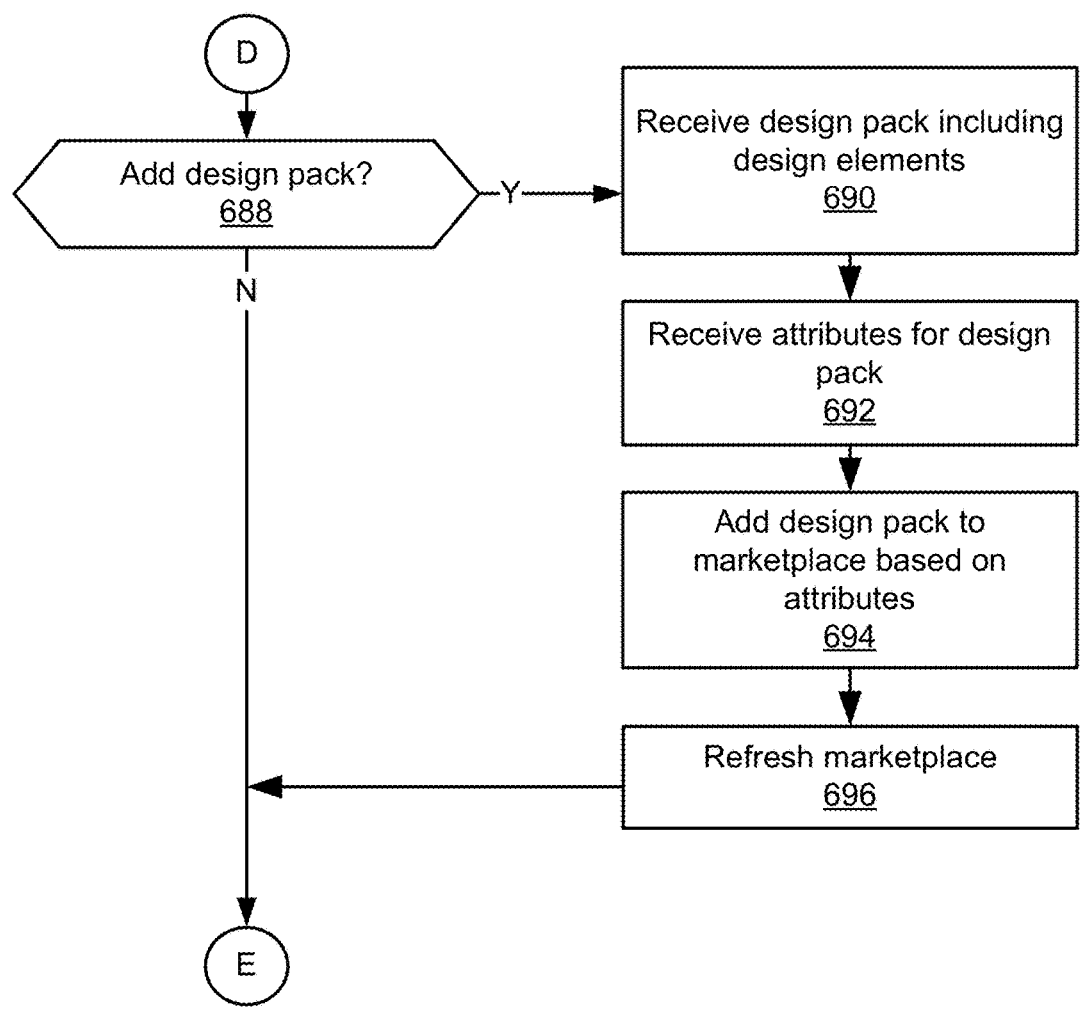

FIGS. 5A-B include signal diagrams showing an example method 500 for collaborative design. In operation 501, the method 500 may obtaining media on the client device 106a. In some instances, media may be obtained by a user taking a photograph or video using the client device 106a, downloading media from the network 102, accessing media from the camera roll of the client device 106a, etc. The design may be created using the design application 108a based on input received 502 from the first user. The design may be based on a previous design created by the first user or designs created by other users that were shared with the first user. To create the design, the user may add different filter, effect and/or feature layers, remove or modify existing layers, compose and add new layers, and/or modify the underlying media layer, etc., as described elsewhere herein.

In block 506, the method 500 may generate a design object reflecting the final version of the design. In some implementations, this may be in response to the user selecting to publish the design object. Next, in block 507, the method 500 may publish the design object by storing the design object in local storage in association with the first user (e.g., the memory 204) and/or transmitting the design object to the content engine 118. In operation 510, the content engine 118 may store the design object in association with the first user. The method 500 may share a media object (e.g., flat) generated from the design on the social network 550. The social network 550 may be a social network of the design platform associated with the content engine 118, a social network external to the content engine 118, such as one operated by an application engine 550, etc. The media object may be shared 512a by the design application 108 or shared 512b by the content engine 118. In an example, the media object may be shared with a link to the design object hosted on the content engine 118.

Upon receiving the media object, the social network 550 may store 514 the media object in association with the first user and share 516 the media object with one or more other users, such as the second user. In some implementations, responsive to storing the media object in association with the first user, the social network 550 may then post the content to the first user's content stream (e.g., the user's design stream, social network content stream, etc.), and thus share it with other users, such as the second user, who may be connected to the first user in the social network 550. In an example, the second user may receive the media object with the link when he/she accesses his/her social stream on the social network 550. In another example, to share the design, the feed module 232 may post the media object to the design streams of other users of the design platform and these users' may receive the design upon accessing the design streams via design applications 108. These users may in some cases be following the first user on the design platform. In a further example, the design may be shared via a new content section of all or select users' design streams, such as users that are followers of the first user or otherwise connected to the first user on the design platform. Other variations are also possible.

Upon receiving the media object, the design application 108b or another application operating on the client device 106 may receive a selection by the second user in association with the media object. For instance, the second user may select to view the design. In an example, the second user may receive a link with the media object, and upon selecting the link (e.g., hyperlink) via an appropriate interface, may be redirected to an instance of the design application 108b and/or an interface thereof operating on the client device 106b of the second user. Responsive to the selection, the design application 108b may retrieve 522 the design object. In some cases, the design object may already be cached in the memory 204 of the client device 106b and the design application 108b may retrieve 523 the design object from that location. In other cases, to retrieve the design object the design application 108b may the request 524 the design object corresponding to the media object from the content engine 118. In response, the content engine 118 may retrieve 525 the design object and provide 526 the design object to the client device 106b for rendering and display 528 to the second user via the design application 108b. In some implementations, the design application 108b may reconstruct the original (e.g., unflattened) design using the metadata included in the design object the various layers of the original design, such as base media layer and/or subsequent filter, effect, and/or features layers. The design application 108b may then enable 530 the second user to remix the design including the media object and/or layers of the design. In some implementations, no base media layer may be included in the design object provided to the second user, in which case the design object embodies a design template that the second user can use with his or her own media objects (e.g., as the base media layer), such as photographs and videos. In other implementations, the second user may switch out an existing base media layer with one or more of his or her own photographs or videos.

Once a second user has completed remixing his or her version of the design, the design application 108b may generate 532 a design object for the remixed design, which may in some cases include a flat media object and metadata for that object describing the flattened layers. The design application 108b may then publish 534 the (remixed/edited) design object to the content engine 118 in much the same way as was done for the first user. For example, content engine 118 may store 536 the remixed design locally and/or remotely in association with the second user, and the second user may share 538a or 538b the media object of the design (via the design application 108b or the content engine 118) with one or more other users by transmitting the media object to the social network 550. The media object may include a link to the (remixed) design object. Upon receiving the media object, the social network 550 may store 540 the media object in association with the second user and post the media object to the second user's social network content stream. In doing so, the social network 550 may share the media object 542 of the remixed design, which may include the link, with the first user. In response, the design application 108a or another suitable application such an application for viewing the first user's social network content stream, may receive 544 a selection in association with the media object to view the design, and the application may redirect 546 the first user to the design application 108a and/or an interface thereof. For instance, the first user may select a link included with the media object for accessing the remixed design created by the second user. The design application 108a may then retrieve the design object 548, for instance, by either retrieving 548 a previously cached version of the design object from local storage request 548 and/or requesting 549 the remixed design object from the content engine 118, which retrieves 550 the remixed design object from the data store 210 and provides 552 the remixed design object for display. Upon receiving the remixed design object, the design application 108a may render 554 the design object for display to the first user, at which point the first user may further iterate the design, share it with additional users, etc. The method 500 in FIGS. 5A and 5B illustrates an example collaborate design cycle between the first user and second user, which may be repeated in various forms with the same, additional, and/or other users, again and again.

FIGS. 6A-6E are flowcharts of an example method 600 for working with designs and design packs. The operations included in the method 600 may be performed by the design application 108 and/or other components of the system 100. To further understanding, FIGS. 6A-6E are described in association with various figures from FIGS. 9A-9V. In block 604, the method 600 receives input from the user and in block 606, the method 600 processes the input to determine 606 whether the input indicates to add design element, and if so, the method proceeds to block 608 and retrieves and displays design elements corresponding to the input from the user. Non-limiting examples of design elements 930 are depicted in FIG. 9E, which include various filters, text, shapes, crops, lines, frames, textures, text crops, fancy crops, pre-curated image overlays, etc. In some implementations, a design element is added in association with a new layer. For instance, in FIG. 9E, the user selects to add a layer to include a frame element in the design as indicated by reference number 921.

In block 610, the method 600 receives an element selection from the user and in block 612, the method 600 may configure the selected element based on further input from the user. In some implementations, the design element may be preconfigured no further configuration of the design element may be required. In other implementations, further configuration of the design element may be needed and the user may provide, and the method 600 receive, additional design input for configuring the design element. FIGS. 9F and 9G depict an example of such a configuration. In particular, in FIG. 9F the user selects 933 a particular style of frame to add in a new layer to the design from the element menu 934 and in FIG. 9G the user draws 937 and configures the frame 935 (e.g., using his/her finger 902 and the touchscreen 903) according to his/her preferences.

In block 614, the method 600 adds the element (e.g., as configured by the user) to the design. This may be performed in response to an indication by the user that he/she has finished configuring the element, for instance, by selecting the done button 936 depicted in FIG. 9G. The user may view layers that he/she is added to the design by selecting the button 980, which may result in the display layer menu 927, as depicted in FIG. 9H. Using the layer menu 927, the user may view the layers included in the design, such as the frame element layer 939 added in FIG. 9G, further duplicate and/or configured existing layers, delete various layers from the design, etc.

Additional examples of various different elements that can be added to a design are depicted in FIGS. 9H-9Q. For example, in FIG. 9H, a user may select to add a filter layer to the design by selecting the filter button 938. The user may then select which style of filter to add to the design from the list of filters 940 displayed in FIG. 9I. Upon selection of a style from the list of filters 940, the design application 108 may generate a corresponding layer and add it to the design. In FIG. 9, the user may select to add a doodle layer to the design by selecting the doodle button 941. The user may then select a particular doodle from a list of doodles displayed in the element menu 934, such as the doodle 942. Upon selecting this doodle, the design application 108 may generate a corresponding layer including the doodle and add it to the design.

Figure 9L:
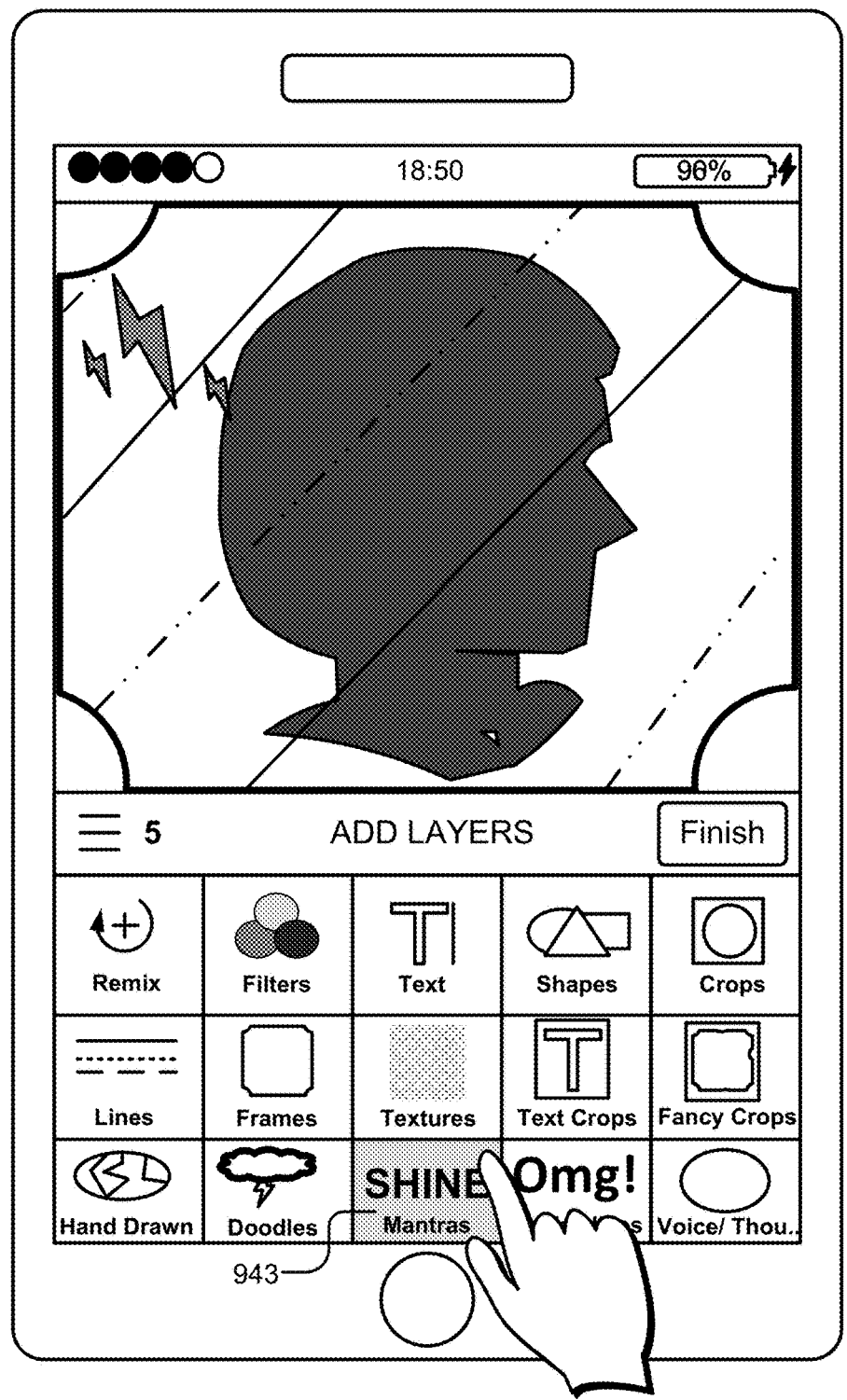
Figure 9M:
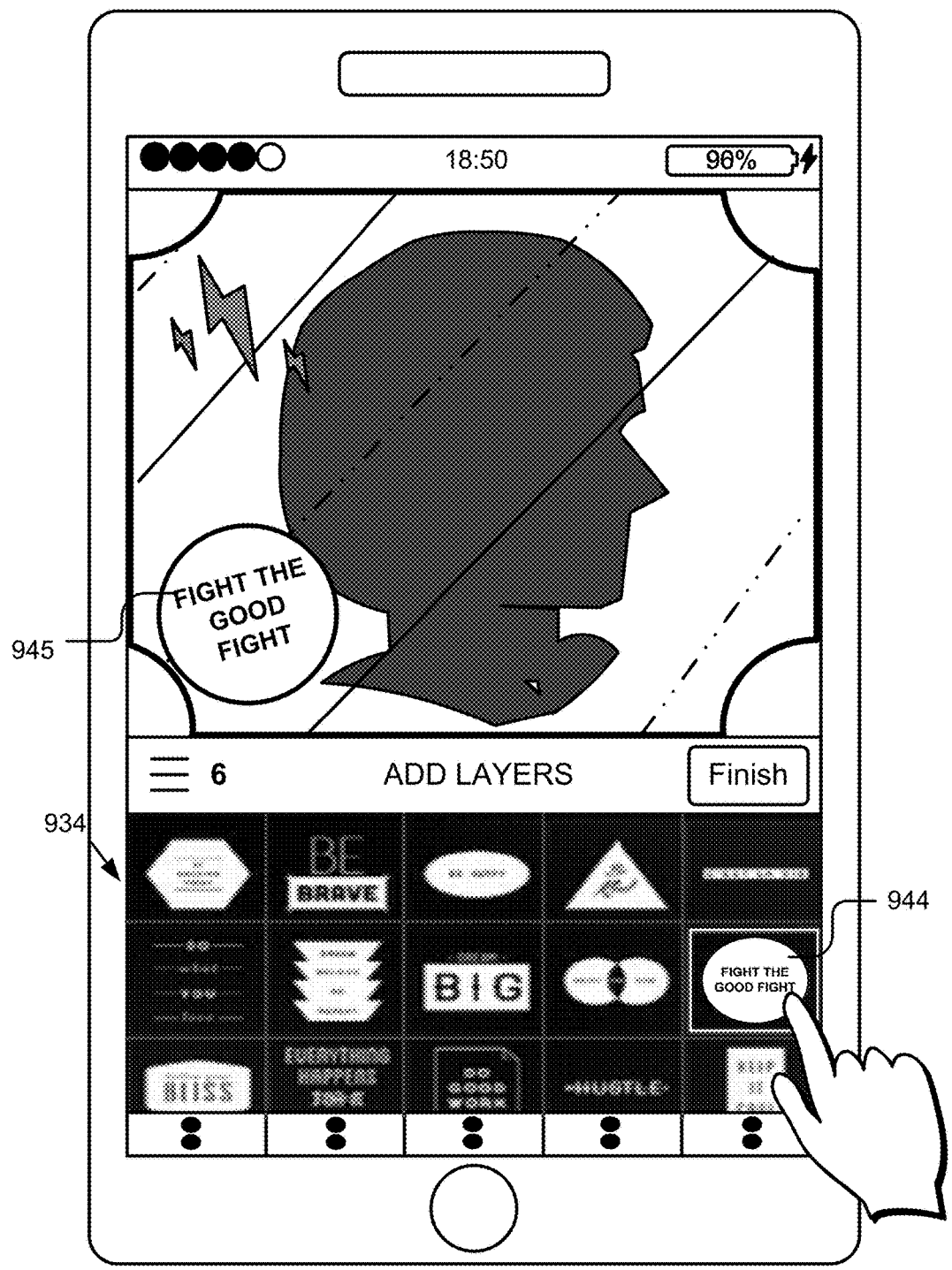
Figure 9N:
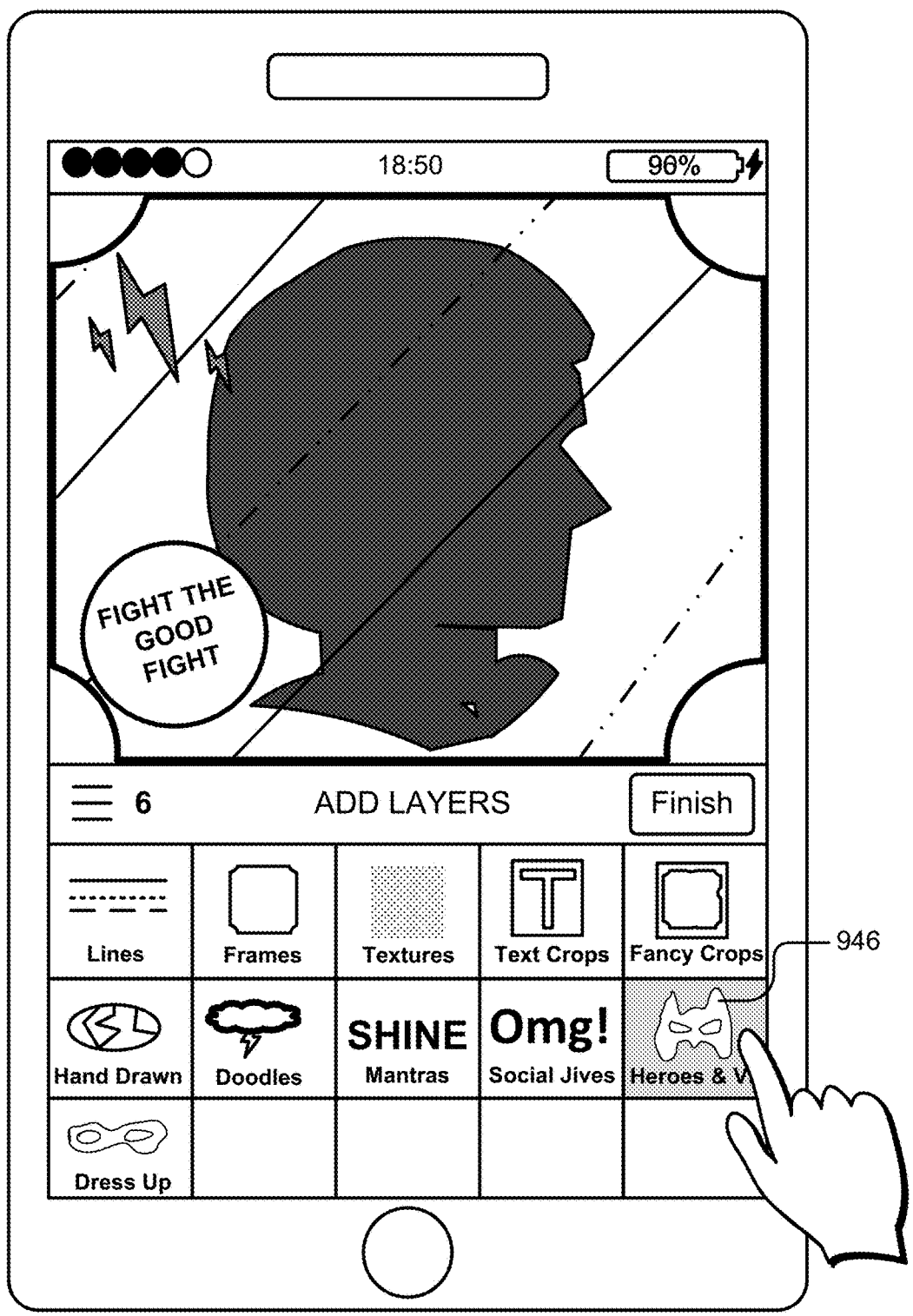
Figure 9O:
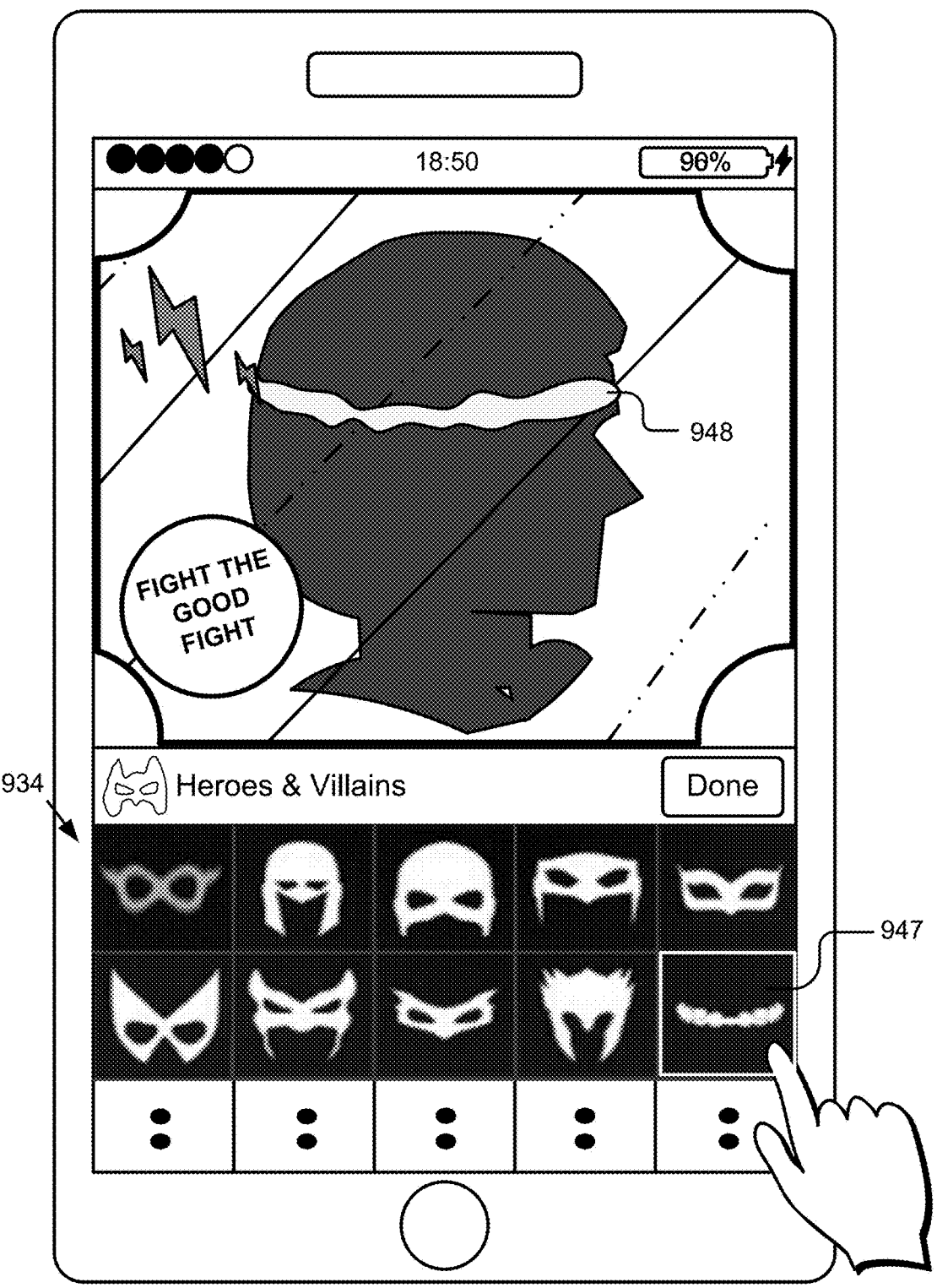
Figure 9P:
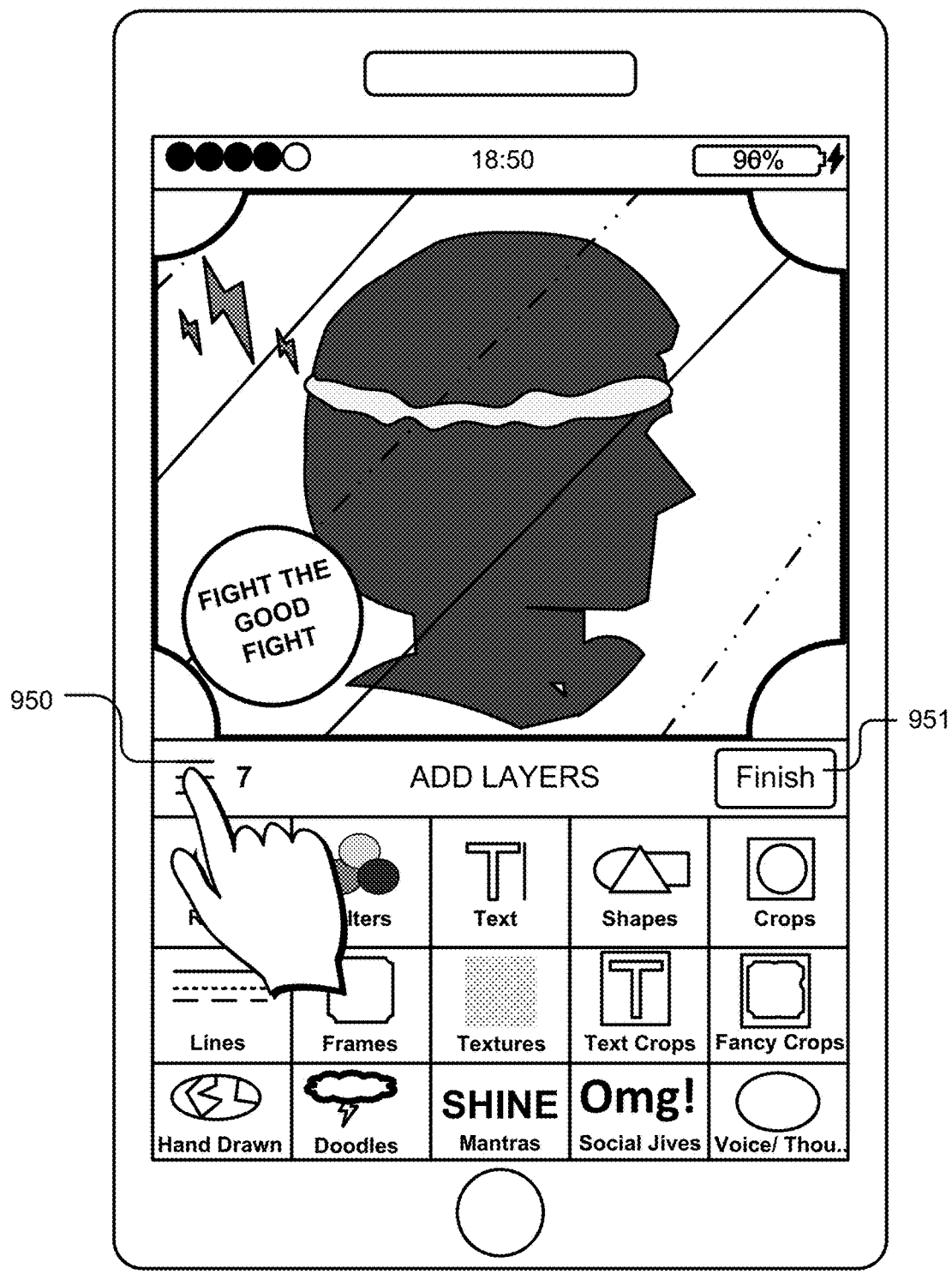
Figure 9Q:
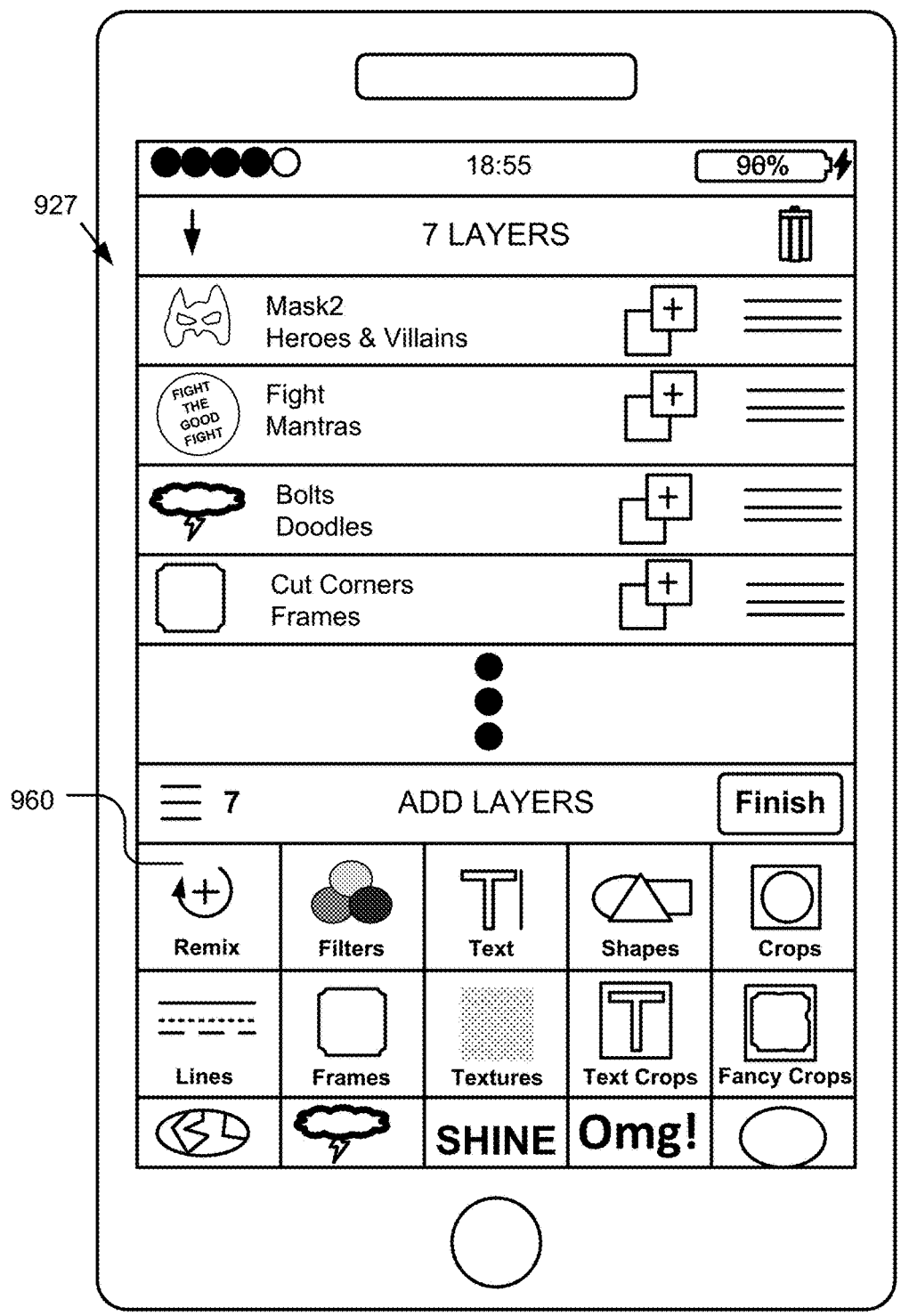

In FIG. 9L, the user may select to add a graphical mantra element to the design, such as a "SHINE" type element 943. Upon selection of his element, the design application may display a corresponding element menu 934 that includes the various different available "SHINE" elements, as shown in FIG. 9M. For example, the user may select the "FIGHT THE GOOD FIGHT" button 944 and a corresponding design element 945 may be added to the design. In FIG. 9N, the user may select to add a graphic (e.g., clipart) from a Heroes and Villains design pack 946. In response, the design application 108 may display the element menu 934 that includes various different design elements for this design pack as shown in FIG. 9O. In this example, the user selects a bandanna button 947, and the design application 108 add a layer including bandanna graphic 948 to the design. As with FIG. 9H, in FIG. 9P, the user may select button 950 to view the design layers currently in the design, and the design application 108 may display a layer menu 927 including the current list of layers comprising the design, as shown in FIG. 9Q.

The objects representing the various elements that can be added to a design may be retrieved from the memory 204 and/or data store 210. In some instances, data representing some or all of the design elements, design packs, etc., may be stored in the memory 204 and retrieved therefrom for quick access.

In block 616, the method 600 refreshes the design displayed to the user with the layer including the new design element added by the user. If, in block 606, the method 600 determines that the input received in block 604 does not indicate to add a design element, then the method proceeds block 618 and determines whether the input indicates to compose a design element. If so, the method proceeds to block 620 and presents to the user a composition interface for designing the design element. The composition interface may include any known interface elements for graphically designing images, such as elements that would be available in a standard image editor. Based on design inputs received from the user using the composition interface, the method 600 composes the design element in block 622 and then in block 624 adds the design element as a layer to the design once the user has finished composing design element. In block 626, the method 600 stores the design element in a data store, such as the memory 204. In some implementations, this adds the user-curated design element to the users own library of custom design elements. In some implementations, the method 600 may store the design element in association with a design pack as curated by the user, and once the design pack is complete, the method 600, upon user selection, may submit the design pack to the content engine 118 for addition to the marketplace and the content engine 118 may store the design pack in association with the user and add the design pack to the marketplace as instructed.

If, in block 618, the method 600 determines that the input received in block 604 does not indicate to compose a design element, then the method 600 proceeds to block 630 and determines whether the user input indicates to resize and/or reposition an aspect of the design, such as a design element, the base media layer, etc. If so, the method 600 proceeds to block 632 and receives input for adjusting the size and/or position of that aspect of the design and then adjusts, in block 634, the size and/or position of the aspect of the design based on the input. For example, the user input may select to move the base media layer, crop the base media layer, zoom in on a portion of the base media layer, move a design element from one point to another point in the design, expand the design element, contract the design element, etc., and the method 600 may adjust the design accordingly. Once finished (e.g., as indicated by the selection of a finished button), the method 600 may refresh the design in block 636.

If, in block 630, the method 600 determines that the input received in block 604 does not indicate to resize and/or reposition aspect of the design, then the method 600 proceeds to block 650 and determines whether the user input indicates to publish the design. If so, the method 600 determines 652 the layers of the design, combines 654 the layers into a single media object, generates 656 metadata for the layers, and then transmits 658 the media object and metadata, which in some cases are collectively referred to as the design object, to the content server for storage, publication, and/or sharing, as discussed in further detail elsewhere herein.

If, in block 650, the method 600 determines that the input received in block 604 does not indicate to publish the design, then the method 600 proceeds to block 660 and determines whether the user input indicates to share the design. If so, the method 600 in block 662 authenticates with a social network server (e.g., the content engine 118, the server 122, another entity of the system 100, etc.) and then sends a request including of media object associated with the design to the social network server requesting sharing of the media object on the social network. The social network server may then share the media object with other users (e.g., of the design platform, of the external social network, etc.) by posting the media object in the content streams (e.g., design streams, social streams, etc.) of those users.

If, in block 660, the method 600 determines that the input received in block 604 does not indicate to share the design, then the method 600 proceeds to block 666 and determines whether the user input indicates to open an existing design. If so, the method 600 retrieves 668 the available design objects (e.g., associated with the user, available for remixing, etc.) from local storage and/or the content server, displays 670 the available design objects to the user (e.g., via an applicable user interface), receives 672 a user selection of a design object that the user wants to open, processes 674 the metadata associated with the design object to reconstruct the design layers of the design to form a copy of the design, and then displays 676 the copy of the design to the user for viewing, remixing, etc. In some instances, when opening an original design or a remixed design that includes the base media layer, the design application 108 may retrieve the base media layer from local storage and/or the content engine 118 separately from the design object. In other instances, the design object may include the base media layer. In further instances, no base media layer maybe included and the user may be prompted to include one or the design object may be applied to an already open image.

In some implementations, the operations 668, 670, 672, 674, and/or 676 are performed formed responsive to receiving a user selection to remix a particular design and the design is opened and displayed for the user to further iterate that design, as discussed elsewhere herein. In some implementations, the design may be the user's own design and he/she may open it to edit the original version of the design and/or create a remixed version of that design.

If, in block 666, the method 600 determines that the input received in block 604 does not indicate to open an existing design, then the method 600 proceeds to block 678 and determines whether the user input indicates to edit a layer. If so, the method 600 determines 680 a layer type for the layer (indicated by the user input to be edited), and displays 682 a corresponding interface for editing the layer type. For instance, editing a line layer may require the different editing options then editing a text layer, and the method 600 generates and displays the appropriate interface for user to use to make the edits based on the type of layer being edited. In block 684, the method 600 receives design input from the user and edits the layer according to the design input. For example, the design input may provide new next for an existing text layer and/or adjust the size and/or font of that text, and the method 600 may modify the existing text accordingly. Once the editing of the layers complete, the method 600 may refresh 686 the design.

If, in block 678, the method 600 determines that the input received in block 604 does not indicate to edit an existing layer, then the method 600 proceeds to block 688 and determines whether the user input indicates to add a design pack to the marketplace. If so, the method 600 receives 690 the design pack including the design elements, receives 692 attributes for the design pack, adds 694 the design pack to the marketplace based on the attributes, and then refreshes the marketplace for the users of the design platform so the newly added design pack is displayed and available to the users. In some implementations, some or all of the aspects of the operations 690, 692, 694, and/or 696 may be performed by the content engine 118.

As a further example, in some implementations, the user may curate the design pack by adding design elements to it, providing descriptors for the design elements and/or the design pack, etc., as discussed above, and then the user may request via the design application 108 that the design pack be submitted to the content engine 118 for addition to the marketplace. In response, the design application 108 may transmit the design pack to the content engine 118 and the content engine 118 may receive the design pack from the design application 108 and add it to the marketplace. In further implementations, a separate application may be used to submit design pack to the content engine 118.

If, in block 688, the method 600 determines that the input received in block 604 does not indicate to add a design pack and/or or upon completion of the above described sets of operations, then the method 600 may return to block 604 and awaits for further input from the user and/or may terminate.

FIGS. 7A and 7B are flowcharts of example methods 700 and 750 for determining the influence of designs and design packs. In reference to FIG. 7A, in block 702, the method 700 may determine a design by a user. For instance, the content engine 118 may receive a design object embodying a design from the design application 108 of the user and/or access the design object from the data store 210. In block 704, the method may share the design via one or more data sharing platforms (e.g., social network(s)). For instance, the design application 108 and/or the content engine 118 may share the design with other users on one or more social networks as discussed elsewhere herein. In response, other users may remix the design (e.g., using respective instances of the design application 108) and the method 400 may track the remixing of the design by the other users in block 706 and/or track the sharing of the remixes of the design by the other users via the one or more data sharing platforms in block 708. For instance, the design application 108 may transmit data describing the sharing and remixing by the users to the content engine 118 for storage and analysis by the analysis module 238. At a certain point, such as in response to receiving a request from a stakeholder, the method 700 may, in block 710, determine the influence of the design based on the remixing of the design by the users and/or the sharing of the remixes of the design by the users and then provide data describing the influence the design has had to a stakeholder, such as the user.

In reference to FIG. 7B, in block 752, the method 750 may determine a design pack including one or more design elements, which the users of the design platform may incorporate into their respective original and/or remixed designs. For instance, the content engine 118 may receive a design pack from another entity of the system 100. In block 754, the method 750 may add the design pack to the marketplace, which may be made accessible to users via their respective instances of the design application 108. In an example, the content engine 188 may store data adding the design pack to the marketplace, and store the design pack in the data store 210 for access and/or retrieval by the various instances of the design application 108, and/or push the design pack to the various instances of the design application 108 for local storage and/or access thereby. In block 756, the method 750 may track usage of one or more design elements of the design pack in designs curated by the users of the design platform and/or in block 758, the method 750 may track sharing the designs having one or design elements from the design pack. In an example, the content engine 118 may store metadata memorializing the different layers of each of the original and/or remixed designs and may store social data describing the sharing of these original and or remixed designs, which the analysis module 238 may use to track remixing and/or sharing of the designs. In block 760, the method 750 may determine the influence of the design pack and/or the one or more elements of the design pack based on usage of the one or design elements in the designs and/or the sharing of the designs that include one or design elements from the design pack via one or more data sharing platforms, such as social networks. In block 762, the method 750 may then provide data describing the influence of the design pack and/or the one or more elements of the design pack to a stakeholder, such as the user from which the design pack was received, a business that the design pack is associated with, etc.

FIGS. 9A-9V are graphical representations of various example design-related user interfaces. In particular, FIGS. 9A-9D depict various user interfaces for initializing a remix of an existing design. For instance, in FIG. 9A, user interface 900 is shown which includes an existing design 905 having a base layer 915 and a plurality of supplemental layers including various graphical design elements, such as lines and the hashtag "SWIM CHAMPIONS." The Interface 900 may also include an identity region 907 that indicates who the creator of the design was, a description region 908 including various descriptors describing the design and a set of interface elements for commenting on the design, downloading the design, favoriting/liking the design, refreshing interface for additional comments, etc. The interface 900 may also include a remix button 906, which in this case the user selects to remix the design 905, as well as menu buttons 908, 929, 910, 912, and 914, which are selectable to access a home screen of the design application 108, access a discovery interface presenting design ideas and suggestions to the user, create a remix of an existing design, download various designs, and access the users design stream, respectively. Other elements could also be included, such as a button and/or interface for accessing and/or viewing the marketplace including various designs and/or design packs, etc. The design 905 may be one of many in a series included in the design stream 904 (the rest of which are hidden from view but viewable by scrolling the interface 900).

Upon selecting to remix the design, the design application 108 may display an interface for capturing an image using a camera of the user's client device 106. The interface may include buttons for controlling the camera, such as the button 923, as well as buttons 921 and 922 for obtaining the image from other sources, such as the user's camera roll and/or a search engine, respectively. In this example, the user selects button 923 capture an image 920 of him/herself. The image 920 is then inserted into the design by the design application 108 as the base media layer. In FIG. 9C, the user may select button 924 to show a layer menu 927 as shown in FIG. 9D, which may be used to view and/or further configure the layers of the design. As shown, the layers included in the layer menu 927 form the new/remixed design and were reconstructed by the design application 108 from the existing design 905 that the user selected to remix.

Figure 9R:
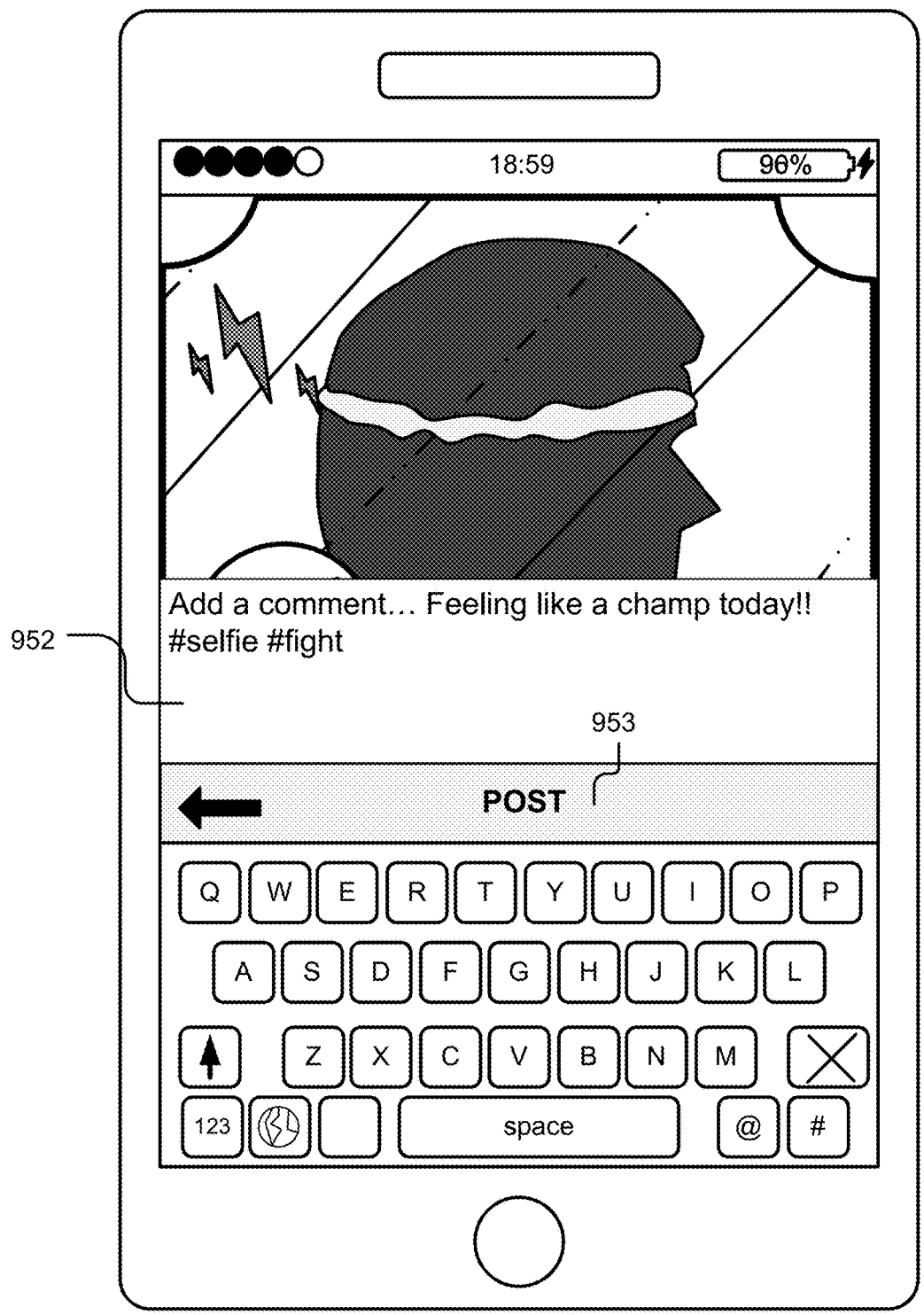
Figure 9S:
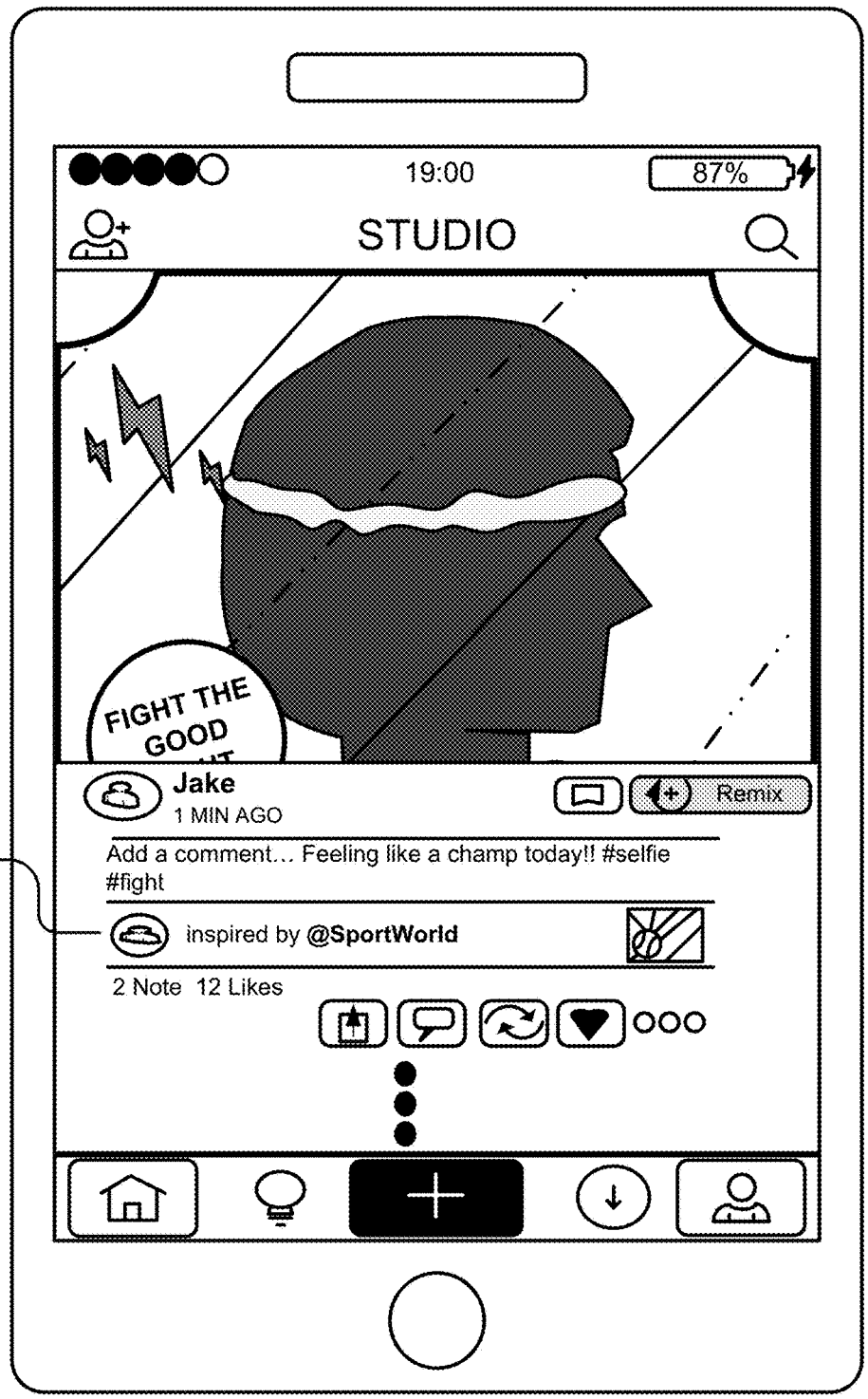

FIGS. 9E-9Q are discussed above so their description will not be repeated here. In FIG. 9R, the user may add a description to the design that he/she has curated (e.g., remixed) using the description field 952 and then select to post the design to his/her design stream by selecting the post button 953. In this example, selecting the post button 953 will publish the design to the user's library as well as share the design as discussed elsewhere herein. While not depicted, the user may have granular control over the users that the design is shared with on the design platform and/or one or more other data sharing platforms, such as the social networks. For instance, the user may share the design with all the users within that user's social graphs or may select specific users and/or groups of users with which to share the design. In FIG. 9S, the user's design has been posted to a design stream and the interface thereof includes interface options previously described as well as an indication 954 of who the design was inspired by (derived from and/or attributable to (at least in part)).

Figure 9T:
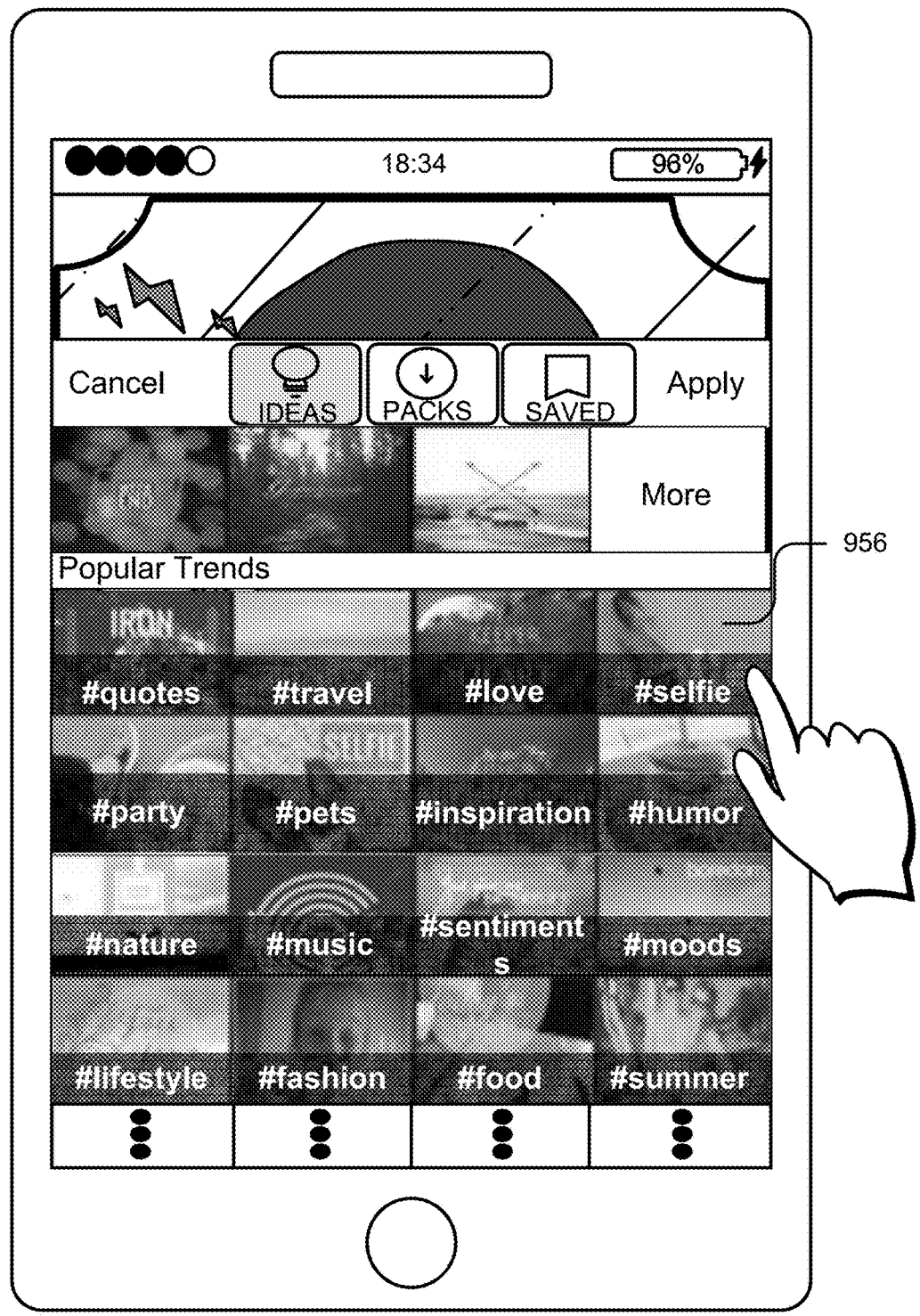
Figure 9U:
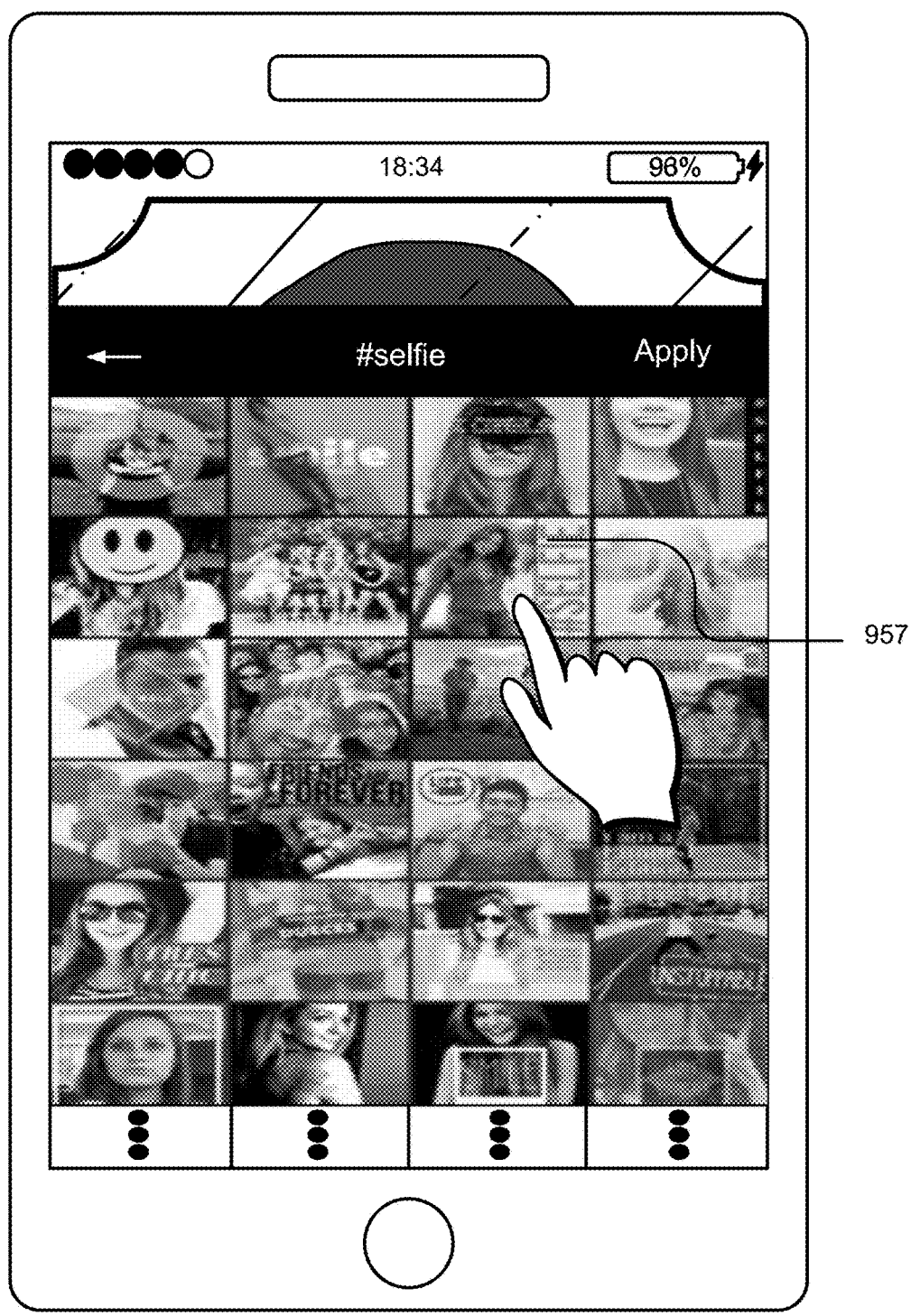
Figure 9V:
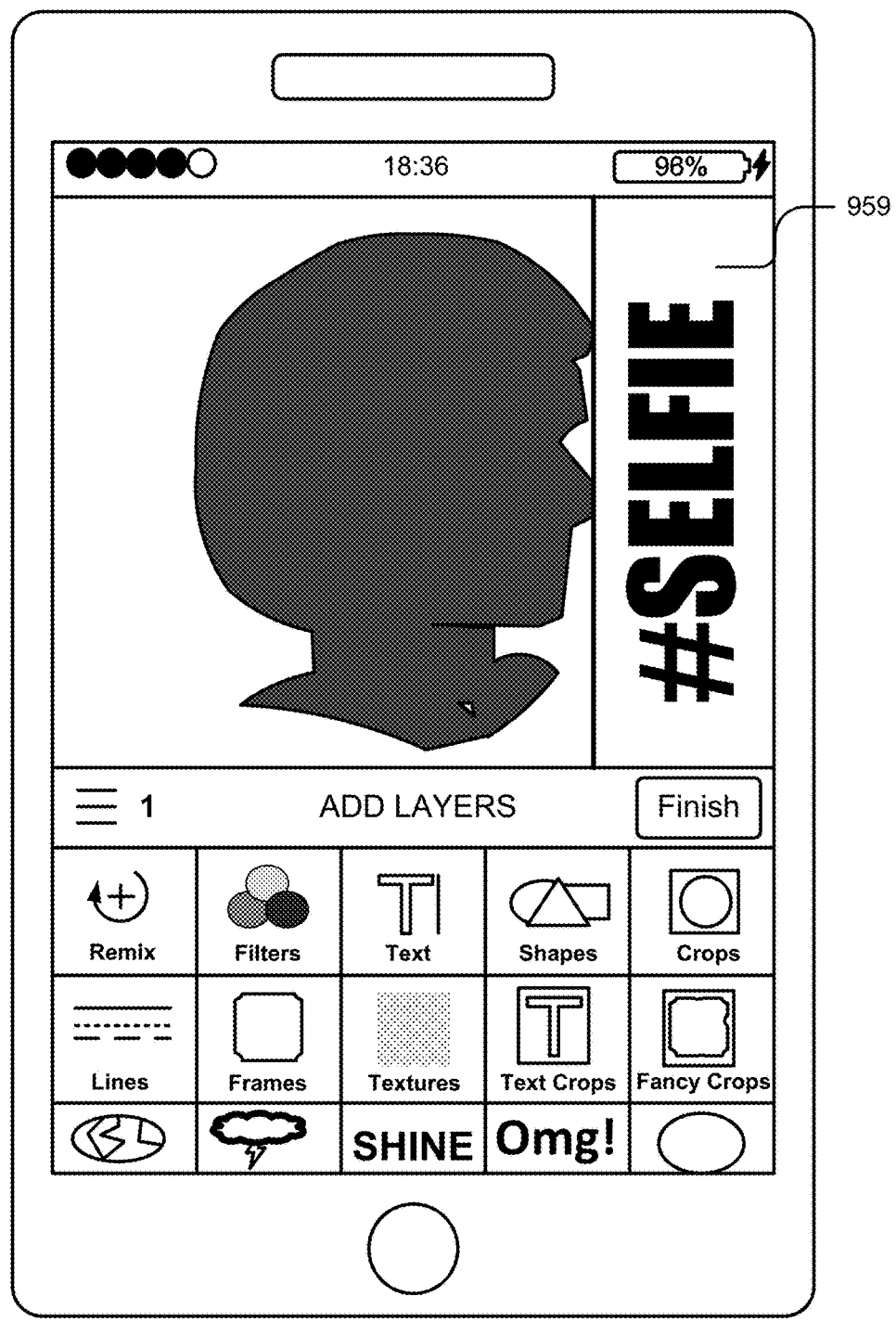

In FIG. 9Q, the user may select to remix his or her design that is in progress (but not yet finalized) using the remix button 960. As a result, the user may select to apply (additionally or alternatively) an alternative design to the design being curated. For instance, a scrollable list of existing designs may be displayed and user may select one of the designs styles from the list, such as the design style 956, as shown in FIG. 9T, and select a particular design from that style, such as design 957, as shown in FIG. 9U. In response, the design application 108 may apply the design by removing the layers currently in the design and then incorporating the layers from the newly selected design 957 (e.g., by processing the metadata associated with that design). The design application 108 may then present the updated, newly-remixed design to the user that includes the new design element 959 from design 958, as shown in FIG. 9V.

It should be understood that the user interfaces provided in FIGS. 9A-9V should not be considered limiting but rather are provided to help further illustrate various implementations that are possible. As such, these interfaces may take other forms and include, additionally or alternatively, other elements, without departing from the scope of this disclosure.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™)transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:
    determining an initial design embodied by a layered media object created by a user using an instance of a design application;
    sharing the layered media object embodying the initial design via one or more social networks accessible via a computer network;
    tracking remixing of the initial design into remixes and remixing of the remixes of the initial design into further remixes, the remixes and the further remixes embodied by modified versions of the layered media object of the initial design by users using instances of the design application;
    tracking sharing of the initial design and the modified versions of the layered media object of the initial design, by the users using the instances of the design application via the computer network and the one or more social networks;
    determining an influence of the initial design based on at least 1) the tracking of the remixing of the initial design and the further remixes by the users, and 2) the tracking of the sharing of the remixes of the initial design and the further remixes by the users using the instances of the design application via the computer network and the one or more social networks, the influence of the initial design measuring a level at which the initial design affected the users; and
    providing data describing the influence of the initial design to the user.

2. The computer-implemented method of claim 1, wherein the one or more social networks are each embodied by software that expose APIs for sharing designs with other users on the one or more social networks.

3. The computer-implemented method of claim 2, wherein the sharing of the initial design via the one or more social networks includes flattening the layered media object embodying the initial design into a flattened media object compatible with a media format of the APIs of at least one social network of the one or more social networks and sending a request using the APIs of the at least one social network requesting the initial design be posted to a content stream of the user.

4. The computer-implemented method of claim 1, wherein
determining the influence reflecting the level at which the users respond to the initial design is further based on analytics data describing one or more of a number of the users that remixed the initial design, a remix chain reflecting an evolution of the remixing, a number of the users that shared the initial design via one or more of the one or more social networks, and reactions by the users on the one or more social networks to the initial design.

5. The computer-implemented method of claim 1, wherein the influence of the initial design is calculated using a scale extending from a minimum influence level to a maximum influence level.

6. The computer-implemented method of claim 1, wherein the influence of the initial design measures a level at which the users responded to the initial design by modifying the initial design into the remixes and the further remixes, and the sharing of the initial design, the remixes of the initial design, and the further remixes, on the one or more social networks.

7. The computer-implemented method of claim 1, further comprising:
generating a visual representation of a design history of the initial design based on the tracking of the remixing of the initial design and the remixing of the remixes of the initial design into the further remixes, and the tracking of the sharing of the remixes of the initial design and the further remixes.

8. The computer-implemented method of claim 7, wherein the visual representation of the design history of the initial design includes a timeline format graphing remixes and shares of the initial design as originally produced.

9. The computer-implemented method of claim 1, wherein the tracking of the sharing of the remixes of the initial design and the further remixes includes ingesting share data from at least one of the one or more social networks, wherein the influence of the initial design is determined based on the share data.

10. The computer-implemented method of claim 1, wherein the layered media object embodying the initial design includes a layered image including a plurality of graphical layers, and each of the remixes of the initial design includes one or more of the plurality of graphical layers from the initial design and one or more additional graphical layers input by the users using the instances of the design application.

11. A computer-implemented method comprising:
determining, using one or more computing devices, a design pack including design elements for one or more layers of a layered media object of a design, the design pack being associated with a user;
adding, using one or more computing devices, the design pack to a marketplace accessible by other users via instances of a design application;
tracking, using one or more computing devices, usage of the design elements of the design pack in designs and remixed designs curated by the other users using the instances of the design application;
tracking, using one or more computing devices, sharing of the designs and the remixed designs, which are embodied by layered media objects each having one or more of the design elements from the design pack, via a computer network and one or more social networks; and
determining, using one or more computing devices, an influence of one or more of the design pack and one or more elements of the design pack based on the usage of the design elements in the designs and the remixed designs and the sharing of the designs and the remixed designs including one or more of the design elements from the design pack.

12. The computer-implemented method of claim 11, further comprising:
determining the design, which includes a layered image including a plurality of graphical layers.

* * * * *